(12) United States Patent
Hunter et al.

(10) Patent No.: US 12,160,352 B2
(45) Date of Patent: *Dec. 3, 2024

(54) SCHEDULING METHOD AND SYSTEM FOR MIDDLEWARE-MEDIATED USER-TO-USER SERVICE

(71) Applicant: WHEEL HEALTH INC., Austin, TX (US)

(72) Inventors: Daniel Paul Hunter, Austin, TX (US); Edward Blake Mitchell, Austin, TX (US); Michelle Davey, Austin, TX (US)

(73) Assignee: WHEEL HEALTH INC., Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/356,167

(22) Filed: Jul. 20, 2023

(65) Prior Publication Data
US 2024/0031254 A1 Jan. 25, 2024

Related U.S. Application Data

(60) Provisional application No. 63/390,955, filed on Jul. 20, 2022.

(51) Int. Cl.
*H04L 41/507* (2022.01)
(52) U.S. Cl.
CPC ................... *H04L 41/507* (2013.01)
(58) Field of Classification Search
CPC ............................ H04L 67/1008; H04L 67/60
See application file for complete search history.

(56) References Cited

U.S. PATENT DOCUMENTS 7,426,548 B2 * 9/2008 Griffin ................. G06Q 50/188
709/219
7,441,035 B2 * 10/2008 Lakshmi Narayanan ...................
H04L 9/40
709/227

(Continued)

OTHER PUBLICATIONS

Loewenstern et al. A learning feature engineering method for task assignment, IEEE Network Operations and Management Symposium, pp. 961-967, Apr. 1, 2012.*

(Continued)

*Primary Examiner* — Todd L Barker
(74) *Attorney, Agent, or Firm* — Perkins Coie LLP

(57) ABSTRACT

In an embodiment, a method is performed by a middleware computing platform and includes maintaining an active user pool comprising a plurality of servicing users. The method also includes exposing a service request interface to a plurality of user-to-user service platforms. The plurality of user-to-user platforms provide independent computing environments that separately execute user-to-user service workflows for requesting users. The method further includes receiving, via the service request interface, a plurality of service requests each from one of the plurality of user-to-user service platforms. In addition, the method includes automatically assigning one or more of the plurality of service requests to a target servicing user of the plurality of servicing users based at least in part on information associated with the service request and availability of the target servicing user. The method also includes exposing a service provider interface to the target servicing user. Furthermore, the method includes displaying, on the service provider interface, one or more service events respectively corresponding to the one or more assigned service requests.

20 Claims, 11 Drawing Sheets

(56) References Cited

U.S. PATENT DOCUMENTS

| | | | | |
|---|---|---|---|---|
| 7,496,687 | B2* | 2/2009 | Griffin | G06Q 50/188 |
| | | | | 715/234 |
| 10,630,593 | B2* | 4/2020 | Paramasivam | G06F 9/5083 |
| 2002/0161458 | A1* | 10/2002 | Ahrens | G06Q 10/20 |
| | | | | 700/21 |
| 2003/0220990 | A1* | 11/2003 | Narayanan | H04L 9/40 |
| | | | | 709/227 |
| 2004/0068568 | A1* | 4/2004 | Griffin | G06F 3/0481 |
| | | | | 709/227 |
| 2019/0391855 | A1* | 12/2019 | Bernat | G06F 9/5088 |
| 2020/0186445 | A1* | 6/2020 | Govindaraju | H04L 67/34 |
| 2020/0228602 | A1* | 7/2020 | Spoczynski | H04L 67/1021 |
| 2020/0242258 | A1* | 7/2020 | Smith | H04L 9/3268 |
| 2020/0327217 | A1* | 10/2020 | Soryal | G06F 21/64 |
| 2021/0073059 | A1* | 3/2021 | Swildens | G06Q 10/107 |
| 2021/0089977 | A1* | 3/2021 | Tabak | G06F 3/0482 |
| 2022/0086218 | A1* | 3/2022 | Sabella | H04M 15/66 |
| 2022/0109633 | A1* | 4/2022 | Li | H04L 61/58 |
| 2022/0224758 | A1* | 7/2022 | Milov | H04L 41/22 |
| 2023/0031610 | A1* | 2/2023 | Kuris | G06F 9/5044 |
| 2023/0093389 | A1* | 3/2023 | Zhang | H04L 67/60 |
| | | | | 709/226 |
| 2023/0156826 | A1* | 5/2023 | Palermo | H04W 76/10 |
| | | | | 370/329 |
| 2023/0222531 | A1* | 7/2023 | Cella | G06Q 10/06315 |
| | | | | 705/7.31 |
| 2023/0224228 | A1* | 7/2023 | Dahu | H04L 41/5022 |
| | | | | 709/223 |
| 2023/0319635 | A1* | 10/2023 | Kang | H04W 28/0925 |
| | | | | 370/235 |
| 2023/0342478 | A1* | 10/2023 | Ranganathan | G06F 9/45558 |

OTHER PUBLICATIONS

Liu et al., "Consumer-Centric Web Services Discovery and Subscription" International Conference on e-Business Engineering, pp. 543-550, Oct. 1, 2007.*

Raj et al. "Web Seravice recommendation framework using QoS based discovery and ranking process", 2011 Third International Conference on Advanced Computing, pp. 371-377, Dec. 1, 2011.*

Graftberger et al., "FedLess: Secure and Scalable Federated Learning Using Serverless Computing", IEEE International Conference on Blg Data, Jan. 13, 2022.*

Singh et al., "Building Communicating Web Applications Leveraging Endpoints and Cloud Resource Service", 2013 IEEE Sixth International Conference on Cloud Computing, Jun. 1, 2013, IEEE Publishing.*

* cited by examiner

FIG. 10

SCHEDULING METHOD AND SYSTEM FOR MIDDLEWARE-MEDIATED USER-TO-USER SERVICE

CROSS-REFERENCE TO RELATED APPLICATIONS

Any and all applications for which a foreign or domestic priority claim is identified in the Application Data Sheet as filed with the present application are hereby incorporated by reference under 37 CFR 1.57.

This application claims the benefit of U.S. Provisional Patent Application No. 63/390,955, entitled "SCHEDULING METHOD AND SYSTEM FOR MIDDLEWARE-MEDIATED USER-TO-USER SERVICE," filed Jul. 20, 2022, the contents of which are incorporated by reference herein in their entirety.

BACKGROUND

Users often communicate over a network using, for example, text-based chat, audio and/or video. When the users are associated with different computing systems that each exert a degree of control over the users and their data, it becomes technically difficult to mediate communication with the users without destroying the different access and control interfaces imposed by each system. This is particularly challenging when the data exchanged between the users is sensitive data, as is the case with telemedicine systems.

TECHNICAL FIELD

The specification relates generally to network communication and more particularly, but not by way of limitation, to systems and methods for middleware-mediated user-to-user service between users of different computing systems.

SUMMARY

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

In an embodiment, one general aspect includes a method of scheduling user-to-user service between users of different computing systems. The method is performed by a middleware computing platform and includes maintaining an active user pool comprising a plurality of servicing users. The method also includes exposing a service request interface to a plurality of user-to-user service platforms. The plurality of user-to-user service platforms provide independent computing environments that separately execute user-to-user service workflows for requesting users. The method further includes receiving, via the service request interface, a plurality of service requests each from one of the plurality of user-to-user service platforms. The method also includes automatically assigning one or more of the plurality of service requests to a target servicing user of the plurality of servicing users based at least in part on information associated with the service request and availability of the target servicing user. In addition, the method includes exposing a service provider interface to the target servicing user. The method further includes displaying, on the service provider interface, one or more service events respectively corresponding to the one or more assigned service requests. Other embodiments of this aspect include corresponding computer systems, apparatus, and computer programs recorded on one or more computer storage devices, each configured to perform the actions of the methods.

In an embodiment, another general aspect includes a system that further includes a processor and memory. The processor and memory in combination are operable to implement a method. The memory stores instructions executable by the processor to cause the system to perform operations. The operations include maintaining an active user pool comprising a plurality of servicing users. The operations also include exposing a service request interface to a plurality of user-to-user service platforms. The plurality of user-to-user service platforms provide independent computing environments that separately execute user-to-user service workflows for requesting users. In addition, the operations include receiving, via the service request interface, a plurality of service requests each from one of the plurality of user-to-user service platforms. The operations also include automatically assigning one or more of the plurality of service requests to a target servicing user of the plurality of servicing users based at least in part on information associated with the service request and availability of the target servicing user. The operations additionally include exposing a service provider interface to the target servicing user. The operations further include displaying, on the service provider interface, one or more service events respectively corresponding to the one or more assigned service requests.

In an embodiment, another general aspect includes a computer-program product that further includes a non-transitory computer-usable medium having computer-readable program code embodied therein. The computer-readable program code is adapted to be executed to implement a method. The computer-readable program code is configured with instructions executable by one or more processors to cause the one or more processors to perform operations. The operations are performed by a middleware computing platform and include maintaining an active user pool comprising a plurality of servicing users. The operations also include exposing a service request interface to a plurality of user-to-user service platforms. The plurality of user-to-user service platforms provide independent computing environments that separately execute user-to-user service workflows for requesting users. In addition, the operations include receiving, via the service request interface, a plurality of service requests each from one of the plurality of user-to-user service platforms. The operations also include automatically assigning one or more of the plurality of service requests to a target servicing user of the plurality of servicing users based at least in part on information associated with the service request and availability of the target servicing user. The operations additionally include exposing a service provider interface to the target servicing user. The operations further include displaying, on the service provider interface, one or more service events respectively corresponding to the one or more assigned service requests.

Embodiments disclosed herein provides various technical advantages over conventional systems. First, the middleware computing platform mediates electronic communications of various modalities between computer devices of a pool of servicing users associated with various provider systems and a plurality of service platforms serving different service requesting users. This facilitates effective connection and communication of various network entities in a complex network architecture. Second, the middleware computing platform aggregated data from various service platforms and provider systems and standardize and organize the data based on defined schemas. This enables using the aggregated and standardized data to effectively complete functions such as user matching and service request scheduling, providing technical advantages over data segregated among different service platforms in conventional systems. Third, embodiments disclosed herein allow each servicing user to be assigned service requests from service requesting users from multiple service platforms. The embodiments also provide prioritization and scheduling of tasks on each servicing user's docket based on data aggregated from different service platforms as well as monitoring of service status across multiple service platforms. This allows a greater amount of service requests to be assigned to more servicing users, thus allowing servicing users to obtain a larger and more fluent workflow. Having a better workflow will lead to a greater efficiency in a servicing user's time and allow for better scheduling of the servicing user's work week. This also enables more efficient use of service platforms' resources.

BRIEF DESCRIPTION OF THE DRAWINGS

A more complete understanding of the method and apparatus of the present disclosure may be obtained by reference to the following Detailed Description when taken in conjunction with the accompanying Drawings wherein:

FIG. 10 illustrates an example graphical user interface displaying a servicing user's schedule of service events corresponding to assigned service requests according to some embodiments.

DETAILED DESCRIPTION

Figure 1:
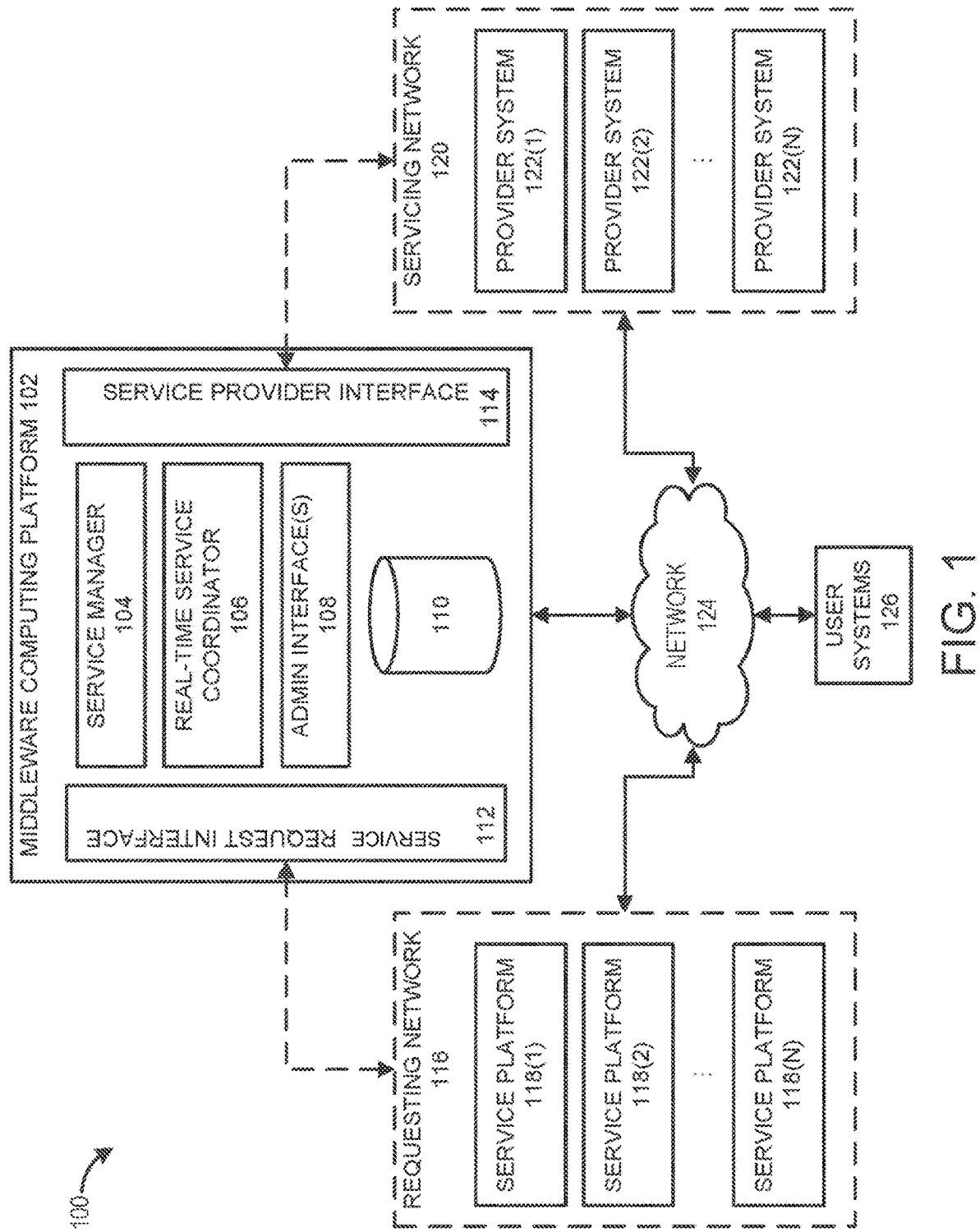
FIG. 1 illustrates an example computing environment for implementing a middleware computing platform.

User-to-user service between users can be conducted via an interactive communication session over a computer network. The interactive communication session can span, for example, a portion of the Internet. and incorporate various different communication modalities such as asynchronous communication, text-based chat, audio and/or video. In addition, or alternatively, the interactive communication session can encompass communication of a digital record that includes, for example, information extracted from a user via an electronic questionnaire or the like. In healthcare settings, the digital record can be a digital health record such as a chart or Subjective. Objective, Assessment and Plan (SOAP) note.

User-to-user service typically involves a requesting user who initiates a request for service and a servicing user who provides the service. In general, the user-to-user service can involve any service or expertise that involves a workflow and/or user communication of certain expertise. An example of user-to-user service is telemedicine, where technology is leveraged to provide remote clinical healthcare. According to this example, the requesting user can be a patient and the servicing user can be a suitable clinician such as a nurse or medical doctor.

In certain cases, it would be advantageous to enable requesting users from multiple different service platforms to potentially be served by a common set of servicing users, where any given servicing user can serve any requesting user on any of the different service platforms. These servicing users could be users of the same provider platform, or users distributed across multiple provider platforms. Problematically, however, service platforms may not want provider systems, or users from outside its own environment, to directly communicate with its requesting users or to have access to sensitive user data. Each service platform might wish to control all user-facing communication and interfaces with its requesting users for business and security reasons. As a further problem, different service platforms may have different requirements for servicing users and require different technical algorithms. All of these factors limit the ability to effectively add a middle layer between service platforms and provider systems. As such, there are technical barriers to integrating requesting users from multiple different service platforms with servicing users from one or more provider systems.

The present disclosure describes examples of systems and methods for middleware-mediated user-to-user service between users of different computing systems. In some embodiments, a middleware computing platform can enable selection and assignment of servicing users to service requests, while allowing itself to be excluded from communication sessions between requesting users and servicing users. In some embodiments, the middleware computing platform can thereafter monitor execution of user-to-user service workflows via separate event communication, for example, that is received from service platforms. Examples will be described below.

FIG. 1 illustrates an example computing environment 100 for implementing a middleware computing platform 102. The computing environment 100 includes the middleware computing platform 102, a requesting network 116, a servicing network 120 and user systems 126, each of which is operable to communicate over a computer network 124. The computer network 124 may be a private network, a public network, a local or wide area network, a portion of the Internet, combinations of the same, and/or the like.

In some embodiments, the middleware computing platform 102 can centrally mediate user-to-user service between requesting users from the requesting network 116 and servicing users from the servicing network 120. For illustrative purposes, the requesting network 116 is shown to include three user-to-user service platforms, namely, a service platform 118(1), a service platform 118(2) and a service platform 118(N) (collectively, service platforms 118), and the servicing network 120 is shown to include three service provider systems, namely, a provider system 122(1), a provider system 122(2) and a provider system 122(3) (collectively, provider systems 122). It should be appreciated that, in various implementations, the requesting network 116 can include any number of user-to-user service platforms and the servicing network 120 can include any number of service provider systems.

The service platforms 118 of the requesting network 116 each provide independent computing environments that separately execute user-to-user service workflows for requesting users. In an example, the service platforms 118 can each be an independent telemedicine system that executes a telemedicine workflow. In general, the service platforms 118 are each configured to establish a communication session between a requesting user and a servicing user for purposes of executing the user-to-user service workflow. The user-to-user service workflow can be customized or specific to each of the service platforms 118 and, in various cases, can include a series or sequence of defined events such as a service-start event, a service-end event, a cancel event, and/or the like. The communication session can incorporate various different communication modalities such as asynchronous communication, text-based chat, audio, video, communication of digital records, combinations of the foregoing and/or the like. The provider systems 122 of the servicing network 120 each provide access to one or more servicing users that collectively constitute an active user pool. In general, the servicing users in the active user pool am those users who have been granted access to one or more of the provider systems 122 and will be considered by the middleware computing platform 102 for service assignments.

The user systems 126 can include any type of computing device, including computer systems such as desktops, laptops, tablets, smartphones, and wearable or body-borne computers, to name a few. The user systems 126 can be operated by any of the types of users described herein. For example, in some embodiments, the user systems 126 can be operated by requesting users associated with one or more the service platforms 118. In addition, or alternatively, the user systems 126 can be operated by servicing users associated with one or more of the provider systems 122. In addition, or alternatively, the user systems 126 can be operated by administrators or super users associated with any of the service platforms 118, the provider systems 122 and/or the middleware computing platform 102.

In some embodiments, the middleware computing platform 102 can centrally mediate user-to-user service between requesting users from the requesting network 116 and servicing users from the servicing network 120. The middleware computing platform 102 is shown to include a service manager 104, a real-time service coordinator 106, one or more administrative interfaces 108, one or more data stores 110, a service request interface 112 and a service provider interface 114. Although an example arrangement of components and modules is shown relative to the middleware computing platform 102, it should be appreciated that the functionality described with respect to these specific components and modules can be distributed among one, two, three, or any other suitable number of components or modules.

In an example, the middleware computing platform 102 can be implemented as a single management server. In another example, the middleware computing platform 102 can be implemented in a plurality of virtual or physical servers, which may or may not be geographically co-located. In some embodiments, the middleware computing platform 102 and/or other aspects of the computing environment 100 may be hosted on a cloud-provider system such as the Azure™ service provided by Microsoft® or the EC2™ platform provided by Amazon®.

In the illustrated embodiment, the middleware computing platform 102 exposes the service request interface 112 to the requesting network 116 and the service provider interface 114 to the servicing network 120. The service request interface 112 can represent, for example, a single or plurality of distinct interfaces designed to be accessed or called by the service platforms 118. Similarly, the service provider interface 114 can represent, for example, a single or plurality of distinct interfaces designed to be accessed or called by the provider systems 122. For example, the service request interface 112 and the service provider interface 114 can each include an application programming interface (API) or a plurality of APIs.

The service manager 104 can manage, in parallel, a lifecycle of each individual service request that is received from the requesting network 116 via the service request interface 112. For example, the lifecycle can begin with a receipt of a service request, include causing an automatic assignment of a servicing user to the service request, and end with either the conclusion or satisfaction of the service request or configurable post-processing related to the same. In some embodiments, the service manager 104 can further track progress of user-to-user service workflows executed by the service platforms 118 and collect data regarding service execution. Example operation of the service manager 104 will be described with respect to FIG. 3.

Advantageously, in some embodiments, the service manager 104 can enable the middleware computing platform 102 to be configurably excluded from communication sessions and user-to-user service workflows that result from its operation. In an example, a service request can be received, via the service request interface 112, from the service platform 118(1), where the service request relates to a particular requesting user. As part of its operation, the service manager 104 can cause a particular servicing user from the active user pool to be automatically assigned to the service request. Thereafter, the service platform 118(1) can establish a communication session between the particular requesting user and the assigned servicing user over a network path that excludes the middleware computing platform 102. In this manner, the service platform 118(1) executes a user-to-user service workflow via the communication session, but the communication session and related sensitive data need not pass through the middleware computing platform 102. An example will be described relative to FIG. 2.

As a further advantage, in some embodiments, the service manager 104 can track progress of user-to-user service workflows executed by the service platforms 118 and collect data regarding service execution even when it is configurably excluded from communication sessions and user-to-user service workflows in the fashion described above. In particular examples, the service manager 104 can receive event communication from the service platforms 118, where the event communication notifies the service manager 104 of certain defined events in a given user-to-user workflow. In some cases, event communication can also be received from a servicing user via one of the user systems 126. An example will be described relative to FIG. 2.

The real-time service coordinator 106 can automatically execute assignments of servicing users to service requests in consideration of information included in the service requests and real-time selection criteria stored, for example, in the data store(s) 110. The real-time selection criteria can include, for example, selection settings, data related to availability of servicing users, data related to qualifications of servicing users, combinations of the foregoing and/or the like. Example operation of the real-time service coordinator 106 will be described with respect to FIG. 4.

In some embodiments, the selection settings used by the real-time service coordinator 106 can indicate, for specific service platforms of the service platforms 118 or for specific classes or categories of requesting users, automatic selection logic. The automatic selection logic can be, or identify, an algorithm for selecting a servicing user to assign to a service request. In an example, the automatic selection logic can involve different algorithms for scoring or rating servicing users, evaluating qualifications of servicing users, combinations of the foregoing and/or the like.

In some embodiments, the data related to availability of servicing users used by the real-time service coordinator 106 can be, or include, granular scheduling information that indicates periods of availability and unavailability for each servicing user in the active user pool, where such granular scheduling information is automatically updated by the real-time service coordinator 106 as requests are assigned. In addition, or alternatively, the data related to availability of servicing users can be, or include, information quantifying a current workload of each servicing user in the active user pool (e.g., a number of assigned service requests). In some embodiments, availability can be toggled on to indicate availability or off to indicate unavailability. For example, the service manager 104, the real-time service coordinator 106 and/or the administrative interface(s) 108 can cause the availability to be toggled on and off for particular servicing users or particular groups of servicing users. In some cases, the toggling can be initiated by the servicing users themselves via the user systems 126. Also, in some cases, the toggling can be initiated or caused by any of the data related to availability described previously (e.g., scheduling information, workload information, etc.).

In some embodiments, the data related to qualifications of servicing users used by the real-time service coordinator 106 can be, or include, characterizations of an expertise of each of the servicing users in the active user pool (e.g., specialties, certifications, etc.). In various cases, the data related to qualifications of servicing users can be received, or accessed from, the provider systems 122. In addition, or alternatively, the data related to qualifications of servicing users used by the real-time service coordinator 106 can be, or include, metrics related to the servicing users' performance in service requests mediated by the middleware computing platform 102. These metrics can include, for example, average response time after case assignment, average satisfaction score received from requesting users for completed service requests, percentage or number of service requests that are declined and/or other information.

The administrative interface(s) 108 can publish a configuration interface, for example, to administrators, super users or other users to select or specify commands and/or provide data. In addition, or alternatively, the administrative interface(s) 108 can generate regular or on-demand reports related to system operation and/or any other component of the computing environment 100. The administrative interface(s) 108 can publish reports or other generated information, for example, to a web page, user dashboard, and/or the like. The web page, user dashboard or other user interface(s) output, for example, by the administrative interface(s) 108, can be accessed by appropriate users of the user systems 126. The administrative interface(s) 108 can also provide a user interface, for instance, that allows the users of the user systems 126 to obtain customized data related to data maintained by the data store(s) 110.

The configuration interface or data that is published via the administrative interface(s) 108 can be specific, for example, to a given system for which a given user is an administrator or super user. In an example, an administrator or super user of the service platform 118(1) may be given a configuration interface that enables input or selection of selection settings, and also a dashboard for platform-specific data. In another example, an administrator or super user of the provider system 122(1) may be given a configuration interface that enables input or selection of servicing users for the active user pool, and also a dashboard for provider-specific data. In still another example, an administrator or super user of the middleware computing platform 102 may be given a configuration interface that allows selection or specification of commands that impact overall system operation, and also a dashboard for system-wide data. Other examples will be apparent to one skilled in the art after reviewing the present disclosure. As discussed previously, any of the foregoing user types may be operators of the user systems 126.

In general, the data store(s) 110 can include any information collected, stored or used by the middleware computing platform 102. For example, in some embodiments, the data store(s) 110 can include selection settings, data related to availability of servicing users, data related to qualifications of servicing users, data collected or received from the service platforms 118, data collected or received from the provider systems 122, data collected or received from servicing users, data identifying servicing users in the active user pool, combinations of the same and/or the like. In some embodiments, data stored in the data store(s) 110 can take the form of repositories, flat files, databases, etc.

In some embodiments, a telemedicine service may be implemented in the network environment illustrated in FIG. 1. In an example, the service platforms 118 can each be an independent telemedicine system that executes a telemedicine workflow. Each telemedicine system may have patients (e.g., requesting users) seeking medical services from clinicians (e.g., servicing users). The middleware computing platform 102 may maintain a pool of clinicians associated with the provider systems 122. The middleware computing platform 102 may receive requests from patients of the telemedicine systems and match the patients to clinicians associated with the servicing network 120. The network environment illustrated in FIG. 1 may alternatively be implemented for the provision of other suitable services.

Figure 2:
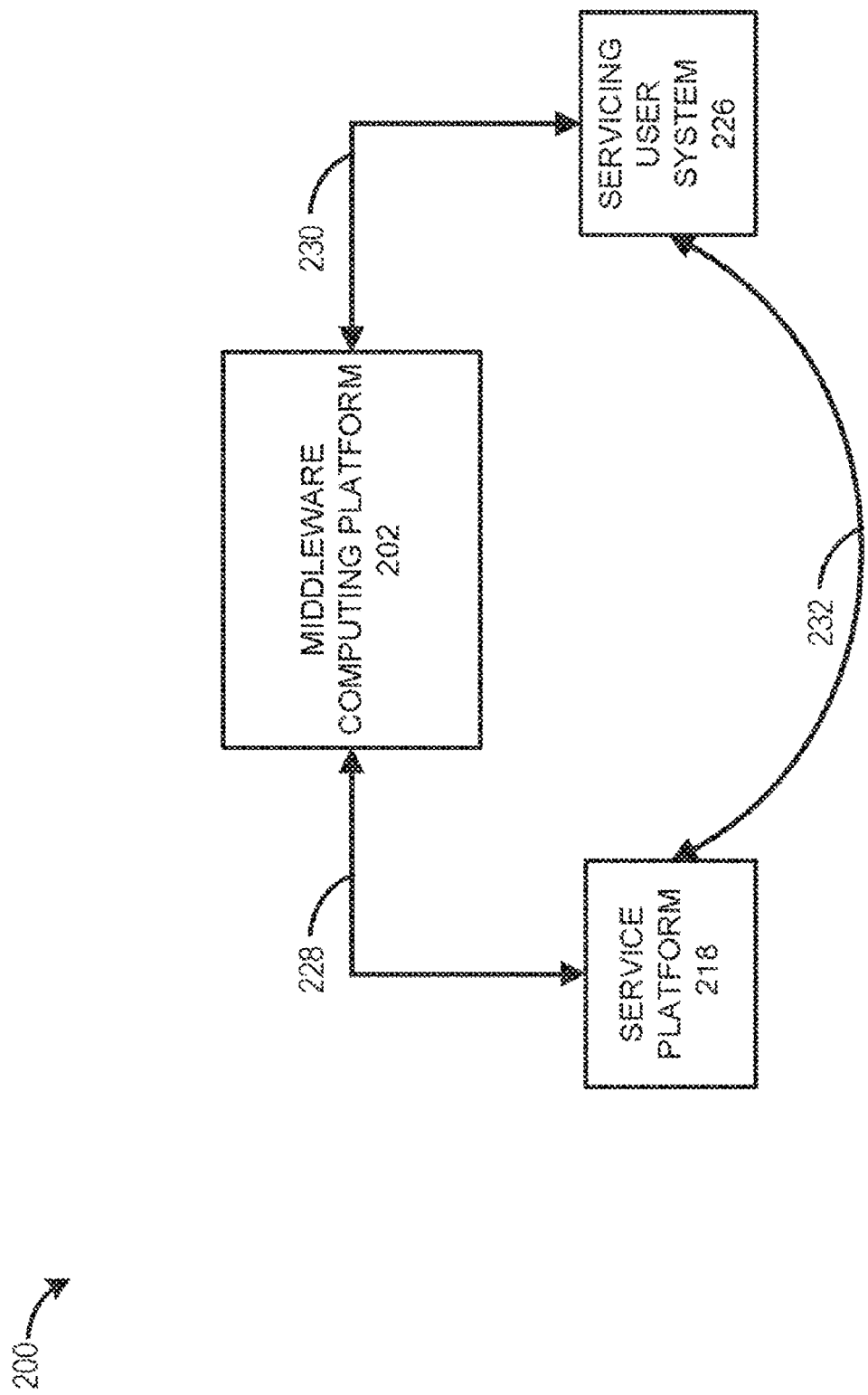
FIG. 2 illustrates an example computing environment for implementing a middleware computing platform.

FIG. 2 illustrates an example computing environment 200 for implementing a middleware computing platform 202. The computing environment 200 includes the middleware computing platform 202, a service platform 218 and a servicing user system 226. In general, the middleware computing platform 202 and the service platform 218 operate as described relative to the middleware computing platform 102 and the service platforms 118, respectively, of FIG. 1. The servicing user system 226 can operate as described relative to the user systems 126. More specifically, for purposes of the example of FIG. 2, the servicing user system 226 is operated by a servicing user in an active user pool as described relative to FIG. 1.

In the example of FIG. 2, network paths 228, 230 and 232 are shown. The network path 228 can include communication that occurs via the service request interface 112. Communication over the network path 228 can include, for example, receipt of a service request, event communication, etc. The network path 230 can include communication that occurs with an assigned servicing user via the service provider interface 114, and can include or pass through a provider system similar to the provider systems 122 of FIG. 1. In general, the network path 232 is representative of a path over which a communication session is established between the service platform 218 and the servicing user system 226. The service platform 218 accordingly executes a user-to-user service workflow via the communication session. The network path 232 excludes the middleware computing platform 202. As such, the service platform 218 tracks the execution of the user-to-user service workflow via, for example, event communication directly from the service platform 218 to the middleware computing platform 202. The event communication can include, for example, identification of a service-start event, a service-end event, a cancel event, combinations of the foregoing and/or the like.

Figure 3:
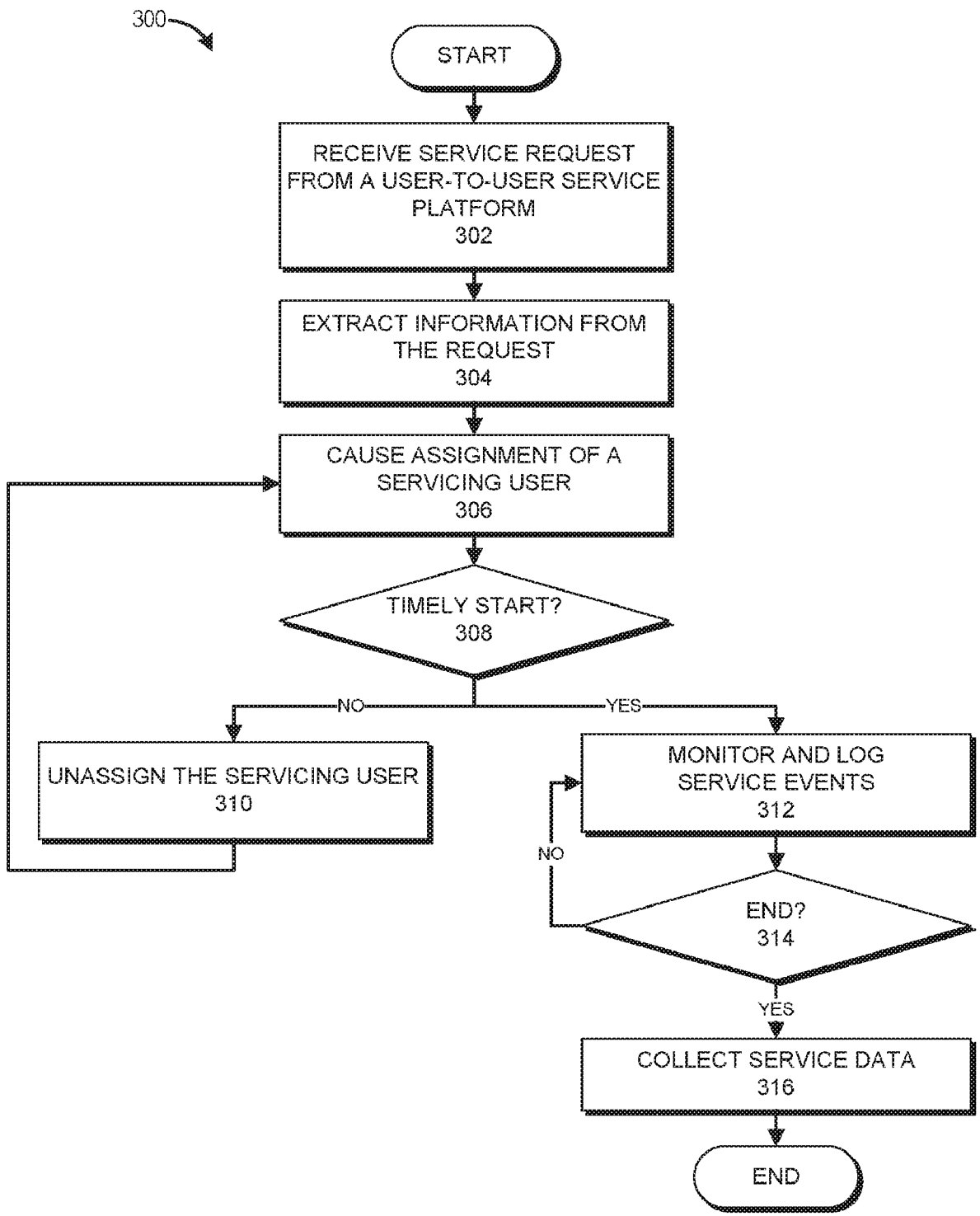
FIG. 3 illustrates an example of a process for mediating user-to-user service between users of different computing systems.

FIG. 3 illustrates an example of a process 300 for mediating user-to-user service between users of different computing systems. In some embodiments, the process 300 can be executed, for example, by the service manager 104 or the real-time service coordinator 106. The process 300 can also be executed generally by the middleware computing platform 102 of FIG. 1. Although the process 300 can be executed by any number of different components, to simplify discussion, the process 300 will be described relative to the middleware computing platform 102 and, more particularly, the service manager 104 of FIG. 1. As described relative to FIG. 1, the middleware computing platform 102 exposes the service request interface 112 to the service platforms 118, and maintains the active user pool described with respect to FIG. 1.

At block 302, the service manager 104 receives, via the service request interface 112, a service request from the service platform 118(1). Although the service request is described as originating from the service platform 118(1) for illustrative purposes, it should be appreciated that the service request could be received from any of the service platforms 118. Examples of information that can be included in the service request is shown below in Table 1.

TABLE 1

| Attribute | Description |
| --- | --- |
| Request Identifier | Identifier for the service request. |
| Requesting User Identifier | Identifier of a requesting user. |
| Service Uniform Resource Locator (URL) | URL for an assigned servicing user to follow upon accepting a service assignment (for later use). |
| Communication Modality | Identification of a communication modality such as asynchronous communication, text-based chat, audio and/or video. |
| Servicing User Type | Identification of a type of servicing user requested. |
| Qualification Data | Data that further qualifies servicing users to fulfill the service request. |
| Preferred Servicing User | Identifier of a preferred servicing user to fulfill the service request. |
| Service Rate Identifier | Identifier of a pay rate for the service request. |
| Service Type | Identification of a type of service being requested. |
| Service Timeframe | Identification of how urgent, with respect to time, that a service needs to be completed by. |

At block 304, the service manager 104 extracts information from the service request. At block 306, the service manager 104 causes an assignment of a servicing user from the active user pool to the service request. In general, the block 306 can involve the service manager 104 triggering operation of the real-time service coordinator 106 so as to cause the assignment. Example operation of the real-time service coordinator 106 will be described in greater detail with respect to FIG. 4.

In general, blocks 308-316 relate to an ability of the service manager 104 to track progress of an execution of a user-to-user service workflow by the service platform 118(1). At decision block 308, the service manager 104 automatically determines whether a service-start event has been timely received from the service platform 118(1). In general, the decision block 308 can involve automatically determining whether a service-start event has been received from the service platform 118(1) within a period of time. The period of time can be a configurable predetermined period of time and, in some cases, might be based on a service level agreement with an operator of the service platform 118(1). In addition, or alternatively, the period of time can be algorithmically determined as a function of one or more variables. In an example, the period of time can be computed by multiplying an SLA-specified period by a constant (e.g., a value between 0 and 1). If it is determined, at the decision block 308, that a service-start event has not been timely received from the service platform 118(1), at block 310, the service manager 104 unassigns the assigned servicing user. In some embodiments, the block 310 can include transmitting, to the service platform 118(1), a message indicating the unassignment. From block 310, the process 300 returns to the block 306 so that the service manager 104 can cause assignment of another servicing user from the active user pool.

If it is determined, at the decision block 308, that a service-start event has been timely received from the service platform 118(1), at block 312, the service manager 104 monitors execution of the user-to-user service workflow by the service platform 118(1) via event communication from the service platform 118(1). The event communication can be received, for example, via the service request interface 112, using a network path similar to the network path 228 of FIG. 2. In general, the block 312 can include logging, in the data store(s) 110, each even that is identified via the event communication.

At decision block 314, the service manager 104 determines whether a service-end event has been received via the event communication. If not, the process 300 returns to block 312 and executes as described previously. Otherwise, if it is determined, at the decision block 314, that a service-end event has been received via the event communication, the process 300 proceeds to block 316.

At block 316, the service manager 104 collects service data related to the execution of the user-to-user service workflow. In an example, the service data can include an evaluation or rating of the assigned servicing user by the requesting user. In another example, the service data can include information related to the performance of the user-to-user service workflow such as, for example, time elapsed between events and/or other information. The service data that is collected at the block 316 can be stored in the data store(s) 110. In some embodiments, the block 316 can be omitted or executed separately from the process 300. After block 316, the process 300 ends.

For simplicity of description, the process 300 is described as being performed with respect to a single service request.

It should be appreciated that, in a typical embodiment, the middleware computing platform 102 manages many such service requests in parallel. For example, in some embodiments, the middleware computing platform 102 can simultaneously execute many hundreds or thousands of iterations of the process 300 in parallel for many hundreds or thousands of service requests.

Figure 4:
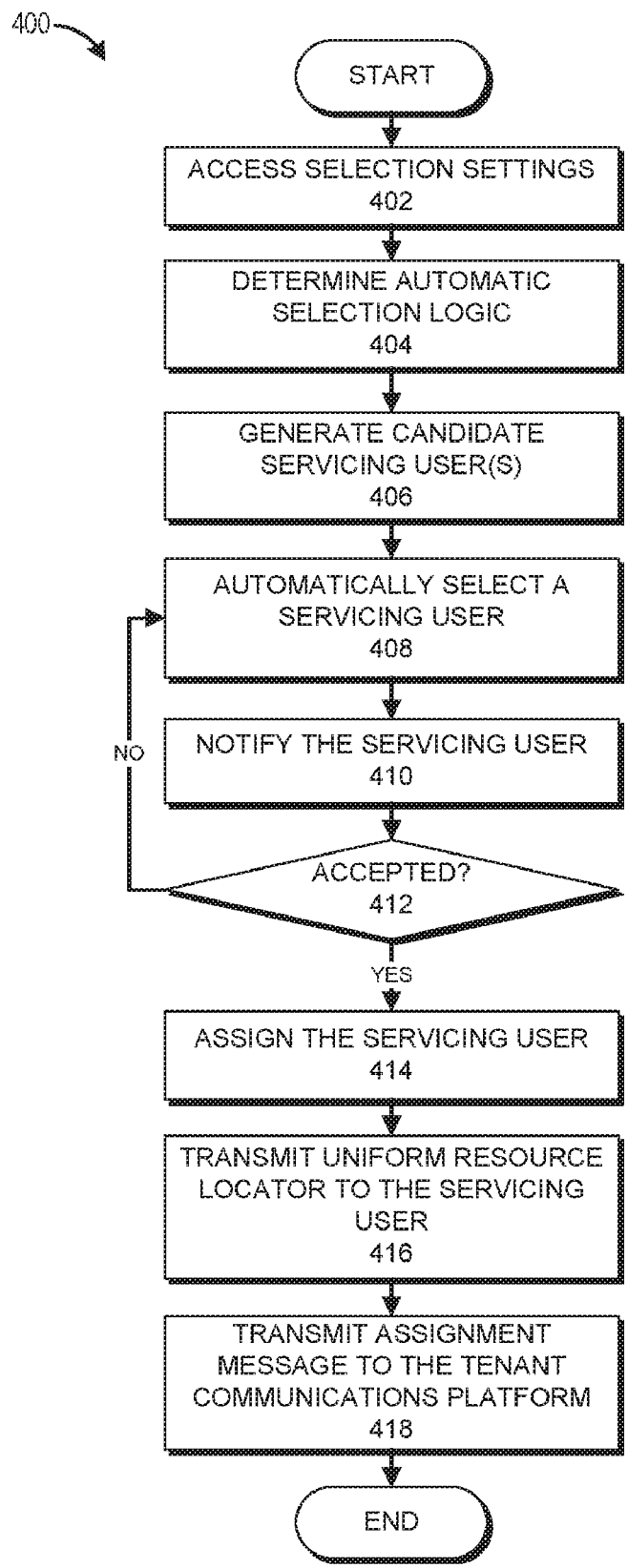
FIG. 4 illustrates an example of a process for executing assignments of servicing users to service requests.

FIG. 4 illustrates an example of a process 400 for executing assignments of servicing users to service requests. In some embodiments, the process 400 can be performed as part of, or in response to, execution of the block 306 of the process 300 of FIG. 3. In some embodiments, the process 400 can be executed, for example, by the service manager 104 or the real-time service coordinator 106. The process 400 can also be executed generally by the middleware computing platform 102 of FIG. 1. Although the process 400 can be executed by any number of different components, to simplify discussion, the process 400 will be described relative to the middleware computing platform 102 and, more particularly, the real-time service coordinator 106 of FIG. 1.

At block 402, the real-time service coordinator 106 accesses selection settings that are applicable to a service request. In some embodiments, the applicable selection settings can be retrieved from the data store(s) 110 as described with respect to FIG. 1. In various cases, the applicable selection settings can be specific to a particular service platform, of the service platforms 118, that originally transmitted the service request. In other cases, the applicable selection settings can be specific to a category or type of requesting user, or specific to information included in the service request. In still other cases, a default set of selection settings can be used across all service requests.

At block 404, the real-time service coordinator 106 determines automatic selection logic based on the applicable selection settings. For example, in embodiments in which the applicable selection settings are specific to a particular service platform, the block 404 can involve the real-time service coordinator 106 determining the automatic selection logic for the particular service platform based on the selection settings. The automatic selection logic can include, for example, variable scoring methodologies that each sum or weight various data parameters related to servicing users.

At block 406, the real-time service coordinator 106 generates candidate servicing user(s) using the automatic selection logic. The automatic selection logic can take into account, for example, real-time availability of servicing users in the active user pool and/or information included in the service request. In some embodiments, the block 406 can yield a list of the candidate servicing user(s). In an example, the list can score or rank the candidate servicing user(s) as specified, for example, by the automatic selection logic.

With reference to the real-time availability of servicing users in the active user pool, the block 406 can involve excluding unavailable servicing users from the candidate servicing users. Availability or unavailability can be a configurable determination that, in some cases, is specified or customizable in the automatic selection logic. In one example, servicing users who are assigned to another service request for which service has not concluded can be deemed unavailable. In another example, servicing users who have more than a threshold number of unconcluded service requests in their queue can be deemed unavailable. In still another example, unavailability can be based on scheduling, where servicing users who are already scheduled for other service requests at a given time are deemed unavailable for any other service requests spanning that time. In yet another example, unavailability can be based on whether availability is on (i.e., available) or off (i.e., unavailable) based on toggling as described previously.

In many cases, unavailability can vary based on communication modality. Servicing users who are assigned to another service request for which service has not concluded might be deemed available for some communication modalities and unavailable for others. For example, servicing users who are assigned to an uncompleted service request involving audio or video communication might be deemed unavailable for any additional service requests. In another example, servicing users who are assigned to an uncompleted service request involving asynchronous communication might be deemed unavailable for additional service requests involving audio or video communication but available for additional service requests involving asynchronous communication. In still another example, servicing users can be excluded from and deemed unavailable for, certain service requests based on availability override settings. This type of unavailability can be preference-based and determined by evaluating the availability override settings against information specified in a service request such as, for example, a servicing user type, qualification data, a preferred servicing user, a service rate identifier, and/or other information. In some embodiments, the availability override settings can originate from individual servicing users and/or corresponding providers with which the individual servicing users are affiliated.

As stated previously, the candidate servicing users can be generated based, at least in part, on information included in the service request. In an example, with reference to Table 1 above, if the service request specifies a servicing user type, qualification data and/or a service rate identifier, the block 406 can include excluding servicing users who are not of the specified servicing user type, who do not satisfy the qualification data and/or who are not made available at the identified service rate. In another example, still with reference to Table 1 above, if the service request specifies a preferred servicing user, the block 406 can include identifying the preferred servicing user. In some such cases, the process 400 can be simplified or bypassed entirely in favor of simply selecting and assigning the preferred servicing user.

Also as stated previously, the candidate servicing users can be scored or ranked based on configurable criteria. The configurable criteria can be specified, for example, in the automatic selection logic. In an example, the configurable criteria can include various data parameters such as, for example, satisfaction scores, a percentage of assignments that are accepted, and/or other data. The data parameters that are included in the configurable criteria can be configurably weighted to suit a given implementation. In some embodiments, resulting scores can be normalized to facilitate comparison.

At block 408, the real-time service coordinator 106 automatically selects a servicing user. In a typical embodiment, the automatically selecting can include identifying the servicing user via the automatic selection logic. For example, in some embodiments, the block 408 can include selecting or identifying a highest scored or ranked servicing user from among the candidate servicing users. At block 410, the real-time service coordinator 106 notifies the selected servicing user. In general, the notification can prompt the user to accept or decline the service request. The notification can be any form of communication such as text message, email, instant message, push notification, dashboard notification, combinations of the foregoing and/or the like.

At decision block 412, the real-time service coordinator 106 determines whether an acceptance has been received from the selected servicing user. In some embodiments, the lack of receipt of an acceptance within a configurable period of time can be considered a declination of the service request. If it is determined, at the decision block 412, that no acceptance has been received from the selected servicing user, a declination can be logged in the data store(s) 110 for the selected servicing user, and the process 400 returns to the block 408 for selection of another servicing user from the candidate servicing users. Otherwise, if it is determined, at the decision block 412, that an acceptance has been received from the selected servicing user, an acceptance can be logged in the data store(s) 110 for the selected servicing user and the process 400 proceeds to block 414.

At block 414, the real-time service coordinator 106 assigns the selected servicing user to the service request. In a typical embodiment, the assignment is logged in the data store(s) 110 and thereafter taken into account when determining availability for other service requests. At block 416, the real-time service coordinator 106 transmits, to the assigned servicing user, a URL to the particular service platform that originally transmitted the service request. In some embodiments, as shown above relative to Table 1, the service request originally received from the particular service platform can include the URL. In many cases, the URL can direct to a page that prompts the assigned servicing user to initiate a user-to-user service workflow, thereby resulting in a service-start event.

At block 418, the real-time service coordinator 106 transmits, to the particular service platform that originally transmitted the service request, a message identifying the assigned servicing user. In a typical embodiment, the particular service platform thereafter waits for the assigned servicing user to navigate to the URL transmitted at the block 416, at which point the particular service platform establishes a communication session between a requesting user associated with the service request and the assigned servicing user. As described previously, the communication session is typically established over a network path that excludes the middleware computing platform 102, and the communication session is used to execute the user-to-user service workflow. After block 418, the process 400 ends.

Figure 5:
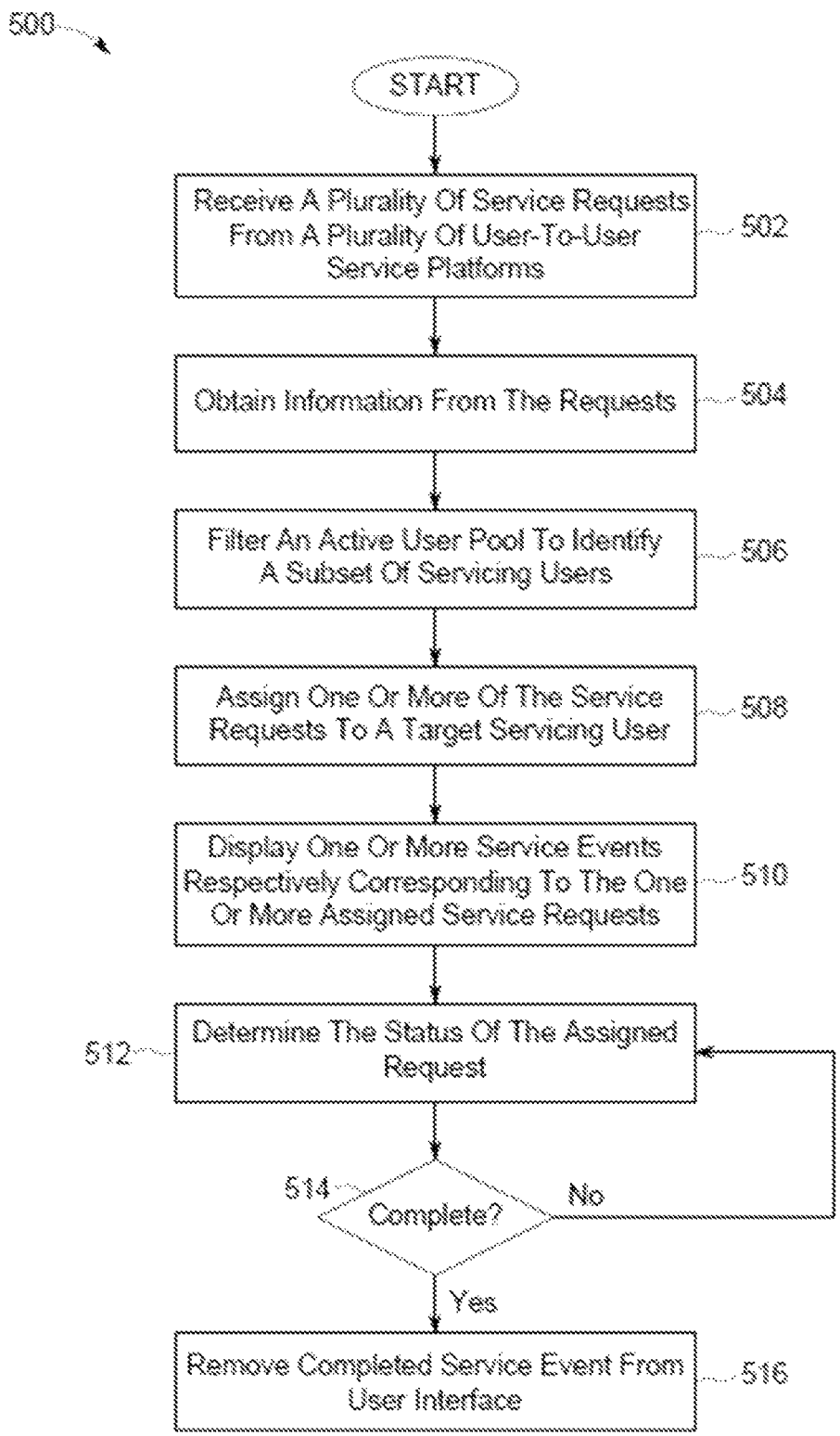
FIG. 5 illustrates an example of a process for executing the assignment of service requests to servicing users and determining the completion of a service request by a servicing user.

FIG. 5 illustrates an example of a process 500 for scheduling user-to-user service between users of different computing systems. In some embodiments, the process 500 can be executed, for example, by the service manager 104 or the real-time service coordinator 106. The process 500 can also be executed generally by the middleware computing platform 102 of FIG. 1. Although the process 500 can be executed by any number of different components, to simplify discussion, the process 500 will be described relative to the middleware computing platform 102 and, more particularly, the service manager 104 of FIG. 1.

At block 502, the service manager 104 may receive, via the request interface 112, a plurality of service requests from a plurality of service platforms 118. In some embodiments, the service request may be received simultaneously. Alternatively, the service requests may be received over a period of time.

At block 504, the service manager 104 may obtain information from the service request. In some embodiments, the service request may comprise various categories of information. Examples of information that can be included in the service request are shown above in Table 1. Information included in the service request may include a type of service being requested, a timeframe in which the service needs to be performed, a time availability of the requesting user, a location of the requesting user, a location for performing the requested service, a pay rate for the requested service, other information related to the service request, or any combination thereof. Based on information included in the service request, the service manager 104 may obtain a service specification associated with the service request. In some embodiments, the service manager 104 may identify pre-formulated service specification based on information associated with the service request. In other embodiments, the service manager 104 may search a database of service specifications based on information associated with the service request to identify a service specification that is applicable to the service request. In other embodiments, the service manager 104 may create a new service specification based on information associated with the service request. The service specification may be associated with a set of requirements associated with the service to be performed including, for example, a payment rate for the service, a service platform associated with the service request, a specialty of service required, a professional license required for the service, a modality of communication of the service, other suitable requirements, or any combination thereof. The service manager 104 may further process information associated with the service request to determine, for example, how urgent the requested service is, how rare or special the requested service is, or the professional license required to perform the requested service.

At block 506, the service manager 104 may filter the active user pool to determine a subset of servicing users who are available and eligible to perform the requested service. The filtering may comprise comparing one or more requirements of the service specification and one or more attributes of the servicing users. The attributes of the servicing users may be stored in one or more data stores 110.

Various criteria may be used to filer the users. As an example, the middleware computing platform 102 may maintain status information of each servicing user in one or more data stores 110. The status information may comprise, for example, active, available, enrolled, break, busy, paused, suspended, inactive, unavailable, other suitable status indicators, or combinations. The status information may be set or controlled by the middleware computing platform 102 or the servicing user through a provider system 122. The filtering process may select servicing users having status information of, for example, active and available. As another example, the service manager 104 may include a servicing user in the subset if the servicing user is enrolled in the service specification corresponding to the service request. As a further example, the service manager 104 may include a servicing user in the subset if the servicing user is in a specialty associated with the service request or is able to perform actions that are required to complete the requested service. A servicing user may be deemed able to perform actions that are required to complete the requested service if the servicing user has the abilities, skills, and/or knowledge to perform such actions. As yet another example, the service manager 104 may include a servicing user in the subset if the servicing user bears a professional license to provide the requested service. The licensure requirement may include licenses based on the location, education, training, practice experience, or other professional qualifications of a servicing user.

In some embodiments, the service manager 104 may filter the servicing users based on availability of the servicing users. The service specification of a service request may label the service request as either synchronous or asynchronous. A synchronous service task may need to be performed in real-time and may require that a servicing user have real-time communication with a requesting user. Real-time communication may include an in-person meeting, a phone call, a video call, real-time messaging, other forms of real-time communication methods between a requesting user and a servicing user, or any combination thereof. A synchronous service request may be on-demand or pre-scheduled. An asynchronous service task may be performed at a time of a servicing user's choosing without having a real-time communication session with a requesting user. Asynchronous service tasks may include creation of a professional opinion, creation of a report, analysis of testing results, other suitable actions, or any combination thereof.

In some embodiments, for a synchronous service request, the service manager 104 may include in the subset those servicing users who have availability in their schedules for one or more synchronous communication sessions. A servicing user's availability may be determined based on a status of the servicing user. For example, a servicing user may have a status such as active, busy or unavailable. The active status of a servicing user in the synchronous system may indicate that the servicing user is available to be assigned one or more synchronous services, is currently online in one or more provider systems in the servicing network 120, and/or is not currently preoccupied with a synchronous service. The busy status of a servicing user may indicate that the servicing user is currently preoccupied and performing a synchronous service. The unavailable status of a servicing user in the synchronous system may indicate that the servicing user is unable to take on any synchronous services. The service manager 104 may include servicing users having an active status in the subset of servicing users. A servicing user's availability may further be determined based on a calendar of the servicing user. In some embodiments, the middleware computing platform 102 may maintain an electronic calendar of each servicing user. Time periods in which a servicing user is scheduled to have synchronous communications sessions are marked as unavailable on the electronic calendar. A servicing user may also mark certain time periods as unavailable on the electronic calendar. A servicing user may be assigned to a service request if the servicing user has availability in a timeframe associated with the service request. For an on-demand service request, a servicing user may be assigned to the service request if the servicing user has immediate availability. One servicing user may be assigned a plurality of synchronous service sessions when assigned synchronous service sessions do not overlap in time. The plurality of synchronous service sessions may be from multiple different service platforms 118.

In some embodiments, for an asynchronous service request, the service manager 104 may include in the subset those servicing users that have general availability in the timeframe associated with the service request. A servicing user's availability to accept an asynchronous service request may be based on a status of the servicing user including, for example, active, suspended, break, available, paused, or busy. The active status of a servicing user may indicate that the servicing user is currently online in one or more provider systems 122 in the servicing network 120. The suspended status of a servicing user in the asynchronous system may indicate that the servicing user is placed in an inactive list of servicing users who are not made available to requesting users. The break status of a servicing user may indicate that the servicing user is away from the one or more provider systems in the servicing network 120 for a particular period of time. The available status of a servicing user in the asynchronous system may indicate that the servicing user is presently able to be assigned an asynchronous service to work on. The paused status of a servicing user may indicate that the servicing user is unable to be assigned any additional service requests for one or more reasons. The busy status of a servicing user may indicate that the servicing user is currently preoccupied and presently performing one asynchronous service. A servicing user may be assigned to an asynchronous service when the servicing user has a present availability to work on the service request. A servicing user may be assigned to an asynchronous service request when the servicing user has general availability to complete the service request within a required period of time or when the servicing user has current availability to perform actions to complete a service request. A servicing user may be assigned one or more asynchronous service requests. The one or more asynchronous service requests may be ordered for the servicing user to fulfill.

At block 508, the service manager 104 may assign one or more of the plurality of service requests to a target servicing user. The target servicing user may be any one of the subset of servicing users. In some embodiments, the servicing user may be chosen in a random manner. The one identified servicing user may be chosen and assigned the service request by the service manager 104 based on the servicing user's service specification, abilities, skills, knowledge and/or availability to complete the requested service, ability to practice and work in multiple locations, or a combination thereof.

In some embodiments, the service manager 104 may score or rank a plurality of servicing users qualified and available to accept a service request based on the service specification and attributes of the servicing users. In this manner, the service manager assigns the service request to the servicing user with the highest score or rank. Alternatively or additionally, the service manager 104 may score or rank a plurality of service requests and select the service request having the highest score or rank to assign to a servicing user.

For example, the service manager 104 may determine a rarity status of a service request. The rarity status of a service request may be determined based on, for example, the difficulty of the requested service, the level of specialty required for the requested service, the availability of servicing users at a location for the requested service, other suitable factors, or any combination thereof. Record of the rarity status of each type of service may be stored in the one or more data stores 110. The service manager 104 may prioritize assignment of service requests determined to be rare. For example, a servicing user eligible to accept a rare service request may be assigned a higher score or rank for accepting the service request. The rare service request may be assigned a higher score or rank for being assigned to a servicing user who is eligible to accept the service request. For example, in the scenario of telemedicine, a service request for brain surgery counseling may be given a higher priority than a service request for a common cold condition when assigned to a clinician having a specialty in brain surgery, who can also treat the common cold.

As another example, the service manager 104 may determine a urgency status of a service request. The urgency status may be determined based on a timeframe specified by the service request or a type of service requested. Record of the various urgency statuses may be stored in the one or more data stores 110. The service manager 104 may prioritize assignment of service requests determined to be urgent.

For example, a servicing user having immediate availability may be assigned a higher score or rank for accepting the service request. The urgent service request may be assigned a higher score or rank for being assigned to a servicing user who is eligible to accept the service request. For example, in the scenario of telemedicine, a service request regarding a cardiovascular condition that may cause stroke may be given a higher priority than a service request for a common cold condition.

Other ranking criteria may be used. For example, the service manager 104 may assign a higher score or rank to a service request from a service platform 118 having a close relationship with a servicing user. As another example, the service manager 104 may assign a higher score or rank to a less busy servicing user.

At block 510, the service manager 104 may display one or more c respectively corresponding to the one or more assigned service requests. The service events may be displayed on the service provider interface 114. The service events may be sorted based on priority. The service provider interface 114 may further comprise a status indicator regarding the status of each service event. Each service event may further comprise elements corresponding to an URL to a service platform that will host a communication session between the requesting user and the servicing user.

In some embodiments, the service manager 104 may provide for display in the service provider interface 114 a prompt for a servicing user to accept a service request. The service provider interface 114 may display information associated with the service request, including, for example, the identity of the requesting user, the type of service being requested, the rarity of the service being requested, the urgency of the service, the time frame in which the service needs to be completed by, the time availability of the requesting user, the location of the requesting user, the location in which the requested service is to be performed in, the pay rate for the service, other suitable information, or any combination thereof. The servicing user may decide to accept or decline the assigned service request. The service manager 104 may determine if the servicing user has accepted the assigned service request. If the service manager 104 determines that the servicing user has declined the assigned service request, then the service manager 104 may assign the service request to another servicing user. If the service manager 104 determines that the servicing user has accepted the assigned service request, the corresponding service event remains in the service provider interface 114 for the servicing user.

At block 512, the service manager 104 may determine a status of the assigned service request. After a servicing user accepts an assigned service request, the servicing user may work on the service request immediately, or at another time. The status of the service request may change according to one or more actions performed by the assigned servicing user. Examples of statuses of the assigned service request may include unstarted, scheduled, in progress, completed, or another suitable status. The service manager 104 may continuously monitor the status of the assigned service request.

At block 514, the service manager 104 may determine whether or not the assigned service request has been completed by the servicing user. If the service manager 104 determines that the servicing user has not completed the assigned service request, then the process 500 returns to block 512 to continuously monitor the status of the assigned request. If the service manager 104 determines that the servicing user has completed the assigned service request, then the process 500 proceeds to block 516.

At block 516, the service manager 104 may remove the service event corresponding to the completed service request from the service provider interface 114. After a servicing user has completed an assigned service request, the servicing user may have additional availability, allowing the servicing user to be assigned new service requests.

In addition to assigning service requests to servicing users, the middleware computing platform 102 may, alternatively, assign servicing users to service requests. When a servicing user becomes available to take on more services, the servicing user may request to be assigned additional service requests. The service manager 104 may extract information associated with the servicing user. Information associated with the servicing user may include the qualifications of the servicing user, the specialties of the servicing user, the licenses of the servicing user, the location(s) where the servicing user is authorized to perform services in, the schedule availability of the servicing user, the service rate associated with the respective servicing user, the service specifications that the servicing user is enrolled in, other suitable attributes, or any combination thereof. The service manager 104 may then select and assign one or more service requests from a pool of a plurality of service requests that are available for the servicing user to perform. The service manager 104 may assign an available service request to the servicing user based on the service specification of the service request, the urgency status of the service request, the rarity of the service request, the type of service, whether the service request is a synchronous service or an asynchronous service, or a combination thereof.

After one or more service requests is assigned to a servicing user or, alternatively, a servicing user is assigned one or more service requests, the servicing user may be placed in an assignment list and removed from the active user pool of servicing users. The assignment list may include the servicing users who are currently assigned an asynchronous service. A servicing user in the assignment list may have an assignment status indicating whether the servicing user has accepted the assigned service request or declined the assigned service request. If a servicing user accepts the assigned service request, the assignment status of the servicing user may further indicate whether the servicing user has started working on the service request, is currently working on the service request, or has completed the service request. When a servicing user has completed an assigned service request, the servicing user may be placed back into the active user pool of servicing users so that the servicing user may be assigned a new service request.

Figure 6:
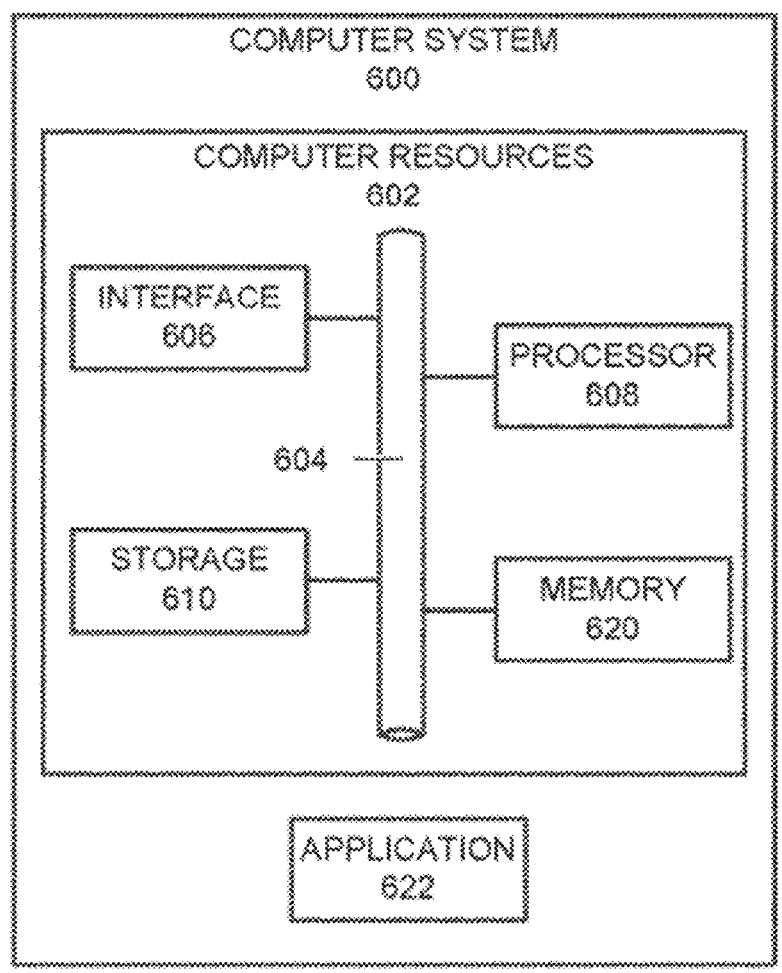
FIG. 6 illustrates an example of a computer system.

FIG. 6 illustrates an example of a computer system 600. In some cases, the computer system 600 can be representative, for example, of any of the service platforms 118, the provider systems 122, the user systems 126, and/or the middleware computing platform 102 or components thereof. The computer system 600 includes an application 622 operable to execute on computer resources 602. In some embodiments, the computer system 600 may perform one or more actions described or illustrated herein. In some embodiments, one or more computer systems may provide functionality described or illustrated herein. In some embodiments, encoded software running on one or more computer systems may perform one or more actions described or illustrated herein or provide functionality described or illustrated herein.

The components of the computer system 600 may include any suitable physical form, configuration, number, type and/or layout. As an example, and not by way of limitation, the computer system 600 may include an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a wearable or body-borne computer, a server, or a combination of two or more of these. Where appropriate, the computer system 600 may include one or more computer systems; be unitary or distributed; span multiple locations; span multiple machines; or reside in a cloud, which may include one or more cloud components in one or more networks.

In the depicted embodiment, the computer system 600 includes a processor 608, memory 620, storage 610, interface 606 and bus 604. Although a particular computer system is depicted having a particular number of particular components in a particular arrangement, this disclosure contemplates any suitable computer system having any suitable number of any suitable components in any suitable arrangement.

Processor 608 may be a microprocessor, controller, or any other suitable computing device, resource, or combination of hardware, software and/or encoded logic operable to execute, either alone or in conjunction with other components. (e.g., memory 620), the application 622. Such functionality may include providing various features discussed herein. In some embodiments, processor 608 may include hardware for executing instructions, such as those making up the application 622. As an example, and not by way of limitation, to execute instructions, processor 608 may retrieve (or fetch) instructions from an internal register, an internal cache, memory 620, or storage 610; decode and execute them; and then write one or more results to an internal register, an internal cache, memory 620, or storage 610.

In some embodiments, processor 608 may include one or more internal caches for data, instructions, or addresses. This disclosure contemplates processor 608 including any suitable number of any suitable internal caches, where appropriate. As an example, and not by way of limitation, processor 608 may include one or more instruction caches, one or more data caches and one or more translation lookaside buffers (TLBs). Instructions in the instruction caches may be copies of instructions in memory 620 or storage 610 and the instruction caches may speed up retrieval of those instructions by processor 608. Data in the data caches may be copies of data in memory 620 or storage 610 for instructions executing at processor 608 to operate on; the results of previous instructions executed at processor 608 for access by subsequent instructions executing at processor 608, or for writing to memory 620, or storage 610; or other suitable data. The data caches may speed up read or write operations by processor 608. The TLBs may speed up virtual-address translations for processor 608. In some embodiments, processor 608 may include one or more internal registers for data, instructions, or addresses. Depending on the embodiment, processor 608 may include any suitable number of any suitable internal registers, where appropriate. Where appropriate, processor 608 may include one or more arithmetic logic units (ALUs); be a multi-core processor; include one or more processors 608; or any other suitable processor.

Memory 620 may be any form of volatile or non-volatile memory including, without limitation, magnetic media, optical media, random access memory (RAM), read-only memory (ROM), flash memory, removable media, or any other suitable local or remote memory component or components. In some embodiments, memory 620 may include random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM, or any other suitable type of RAM or memory. Memory 620 may include one or more memories 620, where appropriate. Memory 620 may store any suitable data or information utilized by the computer system 600, including software embedded in a computer readable medium and/or encoded logic incorporated in hardware or otherwise stored (e.g., firmware). In some embodiments, memory 620 may include main memory for storing instructions for processor 608 to execute or data for processor 608 to operate on. In some embodiments, one or more memory management units (MMUs) may reside between processor 608 and memory 620 and facilitate accesses to memory 620 requested by processor 608.

As an example, and not by way of limitation, the computer system 600 may load instructions from storage 610 or another source (such as, for example, another computer system) to memory 620. Processor 608 may then load the instructions from memory 620 to an internal register or internal cache. To execute the instructions, processor 608 may retrieve the instructions from the internal register or internal cache and decode them. During or after execution of the instructions, processor 608 may write one or more results (which may be intermediate or final results) to the internal register or internal cache. Processor 608 may then write one or more of those results to memory 620. In some embodiments, processor 608 may execute only instructions in one or more internal registers or internal caches or in memory 620 (as opposed to storage 610 or elsewhere) and may operate only on data in one or more internal registers or internal caches or in memory 620 (as opposed to storage 610 or elsewhere).

In some embodiments, storage 610 may include mass storage for data or instructions. For example, in some embodiments, storage 610 can store any of the data described above relative to the data store(s) 110. As an example, and not by way of limitation, storage 610 may include a hard disk drive (HDD), a floppy disk drive, flash memory, an optical disc, a magneto-optical disc, magnetic tape, or a Universal Serial Bus (USB) drive or a combination of two or more of these. Storage 610 may include removable or non-removable (or fixed) media, where appropriate. Storage 610 may be internal or external to the computer system 600, where appropriate. In some embodiments, storage 610 may be non-volatile, solid-state memory. In some embodiments, storage 610 may include read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. Storage 610 may take any suitable physical form and may include any suitable number or type of storage. Storage 610 may include one or more storage control units facilitating communication between processor 608 and storage 610, where appropriate.

In some embodiments, interface 606 may include hardware, encoded software, or both providing one or more interfaces for communication (such as, for example, packet-based communication) among any networks, any network devices and/or any other computer systems. As an example, and not by way of limitation, communication interface 606 may include a network interface controller (NIC) or network adapter for communicating with an Ethernet or other wirebased network and/or a wireless NIC (WNIC) or wireless adapter for communicating with a wireless network.

Depending on the embodiment, interface 606 may be any type of interface suitable for any type of network for which computer system 600 is used. As an example, and not by way of limitation, computer system 600 can include (or communicate with) an ad-hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 600 can include (or communicate with) a wireless PAN (WPAN) (such as, for example, a BLUETOOTH WPAN), a WI-FI network, a WI-MAX network, an LTE network, an LTE-A network, a cellular telephone network (such as, for example, a Global System for Mobile Communications (GSM) network), or any other suitable wireless network or a combination of two or more of these. The computer system 600 may include any suitable interface 606 for any one or more of these networks, where appropriate.

In some embodiments, interface 606 may include one or more interfaces for one or more I/O devices. One or more of these I/O devices may enable communication between a person and the computer system 600. As an example, and not by way of limitation, an I/O device may include a keyboard, keypad, microphone, monitor, mouse, printer, scanner, speaker, still camera, stylus, tablet, touchscreen, trackball, video camera, another suitable I/O device or a combination of two or more of these. An I/O device may include one or more sensors. Some embodiments may include any suitable type and/or number of I/O devices and any suitable type and/or number of interfaces 606 for them. Where appropriate, interface 606 may include one or more drivers enabling processor 608 to drive one or more of these I/O devices. Interface 606 may include one or more interfaces 606, where appropriate.

Bus 604 may include any combination of hardware, software embedded in a computer readable medium and/or encoded logic incorporated in hardware or otherwise stored (e.g., firmware) to couple components of the computer system 600 to each other. As an example, and not by way of limitation, bus 604 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCI-X) bus, a serial advanced technology attachment (SATA) bus, a Video Electronics Standards Association local (VLB) bus, or any other suitable bus or a combination of two or more of these. Bus 604 may include any number, type and/or configuration of buses 604, where appropriate. In some embodiments, one or more buses 604 (which may each include an address bus and a data bus) may couple processor 608 to memory 620. Bus 604 may include one or more memory buses.

Herein, reference to a computer-readable storage medium encompasses one or more tangible computer-readable storage media possessing structures. As an example, and not by way of limitation, a computer-readable storage medium may include a semiconductor-based or other integrated circuit (IC) (such, as for example, a field-programmable gate array (FPGA) or an application-specific IC (ASIC)), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, a flash memory card, a flash memory drive, or any other suitable tangible computer-readable storage medium or a combination of two or more of these, where appropriate.

Some embodiments may include one or more computer-readable storage media implementing any suitable storage. In some embodiments, a computer-readable storage medium implements one or more portions of processor 608 (such as, for example, one or more internal registers or caches), one or more portions of memory 620, one or more portions of storage 610, or a combination of these, where appropriate. In some embodiments, a computer-readable storage medium implements RAM or ROM. In some embodiments, a computer-readable storage medium implements volatile or persistent memory. In some embodiments, one or more computer-readable storage media embody encoded software.

Herein, reference to encoded software may encompass one or more applications, bytecode, one or more computer programs, one or more executables, one or more instructions, logic, machine code, one or more scripts, or source code, and vice versa, where appropriate, that have been stored or encoded in a computer-readable storage medium. In some embodiments, encoded software includes one or more application programming interfaces (APIs) stored or encoded in a computer-readable storage medium. Some embodiments may use any suitable encoded software written or otherwise expressed in any suitable programming language or combination of programming languages stored or encoded in any suitable type or number of computer-readable storage media. In some embodiments, encoded software may be expressed as source code or object code. In some embodiments, encoded software is expressed in a higher-level programming language, such as, for example C, Perl, or a suitable extension thereof. In some embodiments, encoded software is expressed in a lower-level programming language, such as assembly language (or machine code). In some embodiments, encoded software is expressed in JAVA. In some embodiments, encoded software is expressed in Hyper Text Markup Language (HTML), Extensible Markup Language (XML), or other suitable markup language. The foregoing description of embodiments of the disclosure has been presented for purposes of illustration and description. It is not intended to be exhaustive or to limit the disclosure to the precise form disclosed, and modifications and variations are possible in light of the above teachings or may be acquired from practice of the disclosure. The embodiments were chosen and described in order to explain the principals of the disclosure and its practical application to enable one skilled in the art to utilize the disclosure in some embodiments and with various modifications as are suited to the particular use contemplated. Other substitutions, modifications, changes and omissions may be made in the design, operating conditions and arrangement of the embodiments without departing from the scope of the present disclosure. Such modifications and combinations of the illustrative embodiments as well as other embodiments will be apparent to persons skilled in the art upon reference to the description. It is, therefore, intended that the appended claims encompass any such modifications or embodiments.

Depending on the embodiment, certain acts, events, or functions of any of the algorithms described herein can be performed in a different sequence, can be added, merged, or left out altogether (e.g., not all described acts or events are necessary for the practice of the algorithms). Moreover, in some embodiments, acts or events can be performed concurrently. e.g., through multi-threaded processing, interrupt processing, or multiple processors or processor cores or on other parallel architectures, rather than sequentially. Although certain computer-implemented tasks are described as being performed by a particular entity, other embodiments are possible in which these tasks are performed by a different entity.

Figure 7:
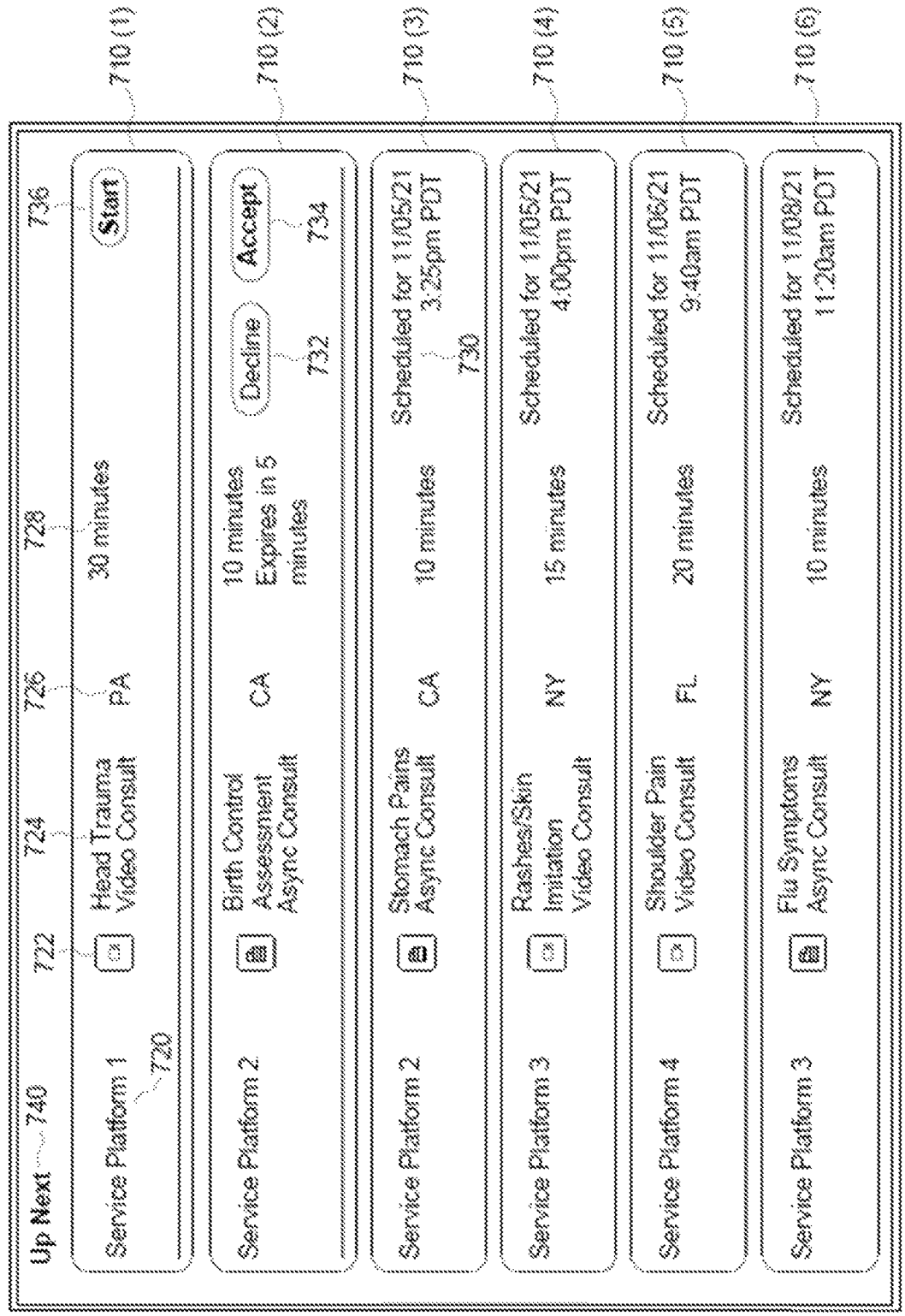
FIG. 7 illustrates an example graphical user interface displaying service events corresponding to assigned service requests according to some embodiments.

FIG. 7 illustrates an example graphical user interface displaying service events corresponding to assigned service requests according to some embodiments. The graphical user interface in FIG. 7 may be implemented and displayed via the service provider interface 114. The graphical user interface may display one or more service events 710, such as for example, service event 710(1), service event 710(2), service event 710(3), service event 710(4), service event 710(5), and service event 710(6). Each service event 710 may include information associated with the respective service, such as the type of service 724, the modality of communication 722, the location of the service and/or requesting user 726, the duration of the service 728, the scheduled time of the service 730, the identity of the requesting user, and the service platform identity 720 of the service platform 118 the provided the corresponding service request. The servicing user may choose to start a particular synchronous service request, for example, service event 710(1), when the scheduled time of the service request has arrived. To do so, the servicing user may, for example, click on a "Start" button 736. The "Start" button 736 may correspond to a URL of a service platform corresponding to the service request. In some embodiments, the particular servicing user may also be assigned an asynchronous service. The servicing user may choose to accept or decline the assigned asynchronous service request, for example, service event 710(2), by interacting with corresponding elements of the graphical user interface. For example, the servicing user may choose to click on a "Decline" button 732 when the servicing user wants to decline the respective assigned asynchronous service. In another example, the servicing user may choose to click on a "Accept" button 734 when the servicing user wants to accept the respective assigned asynchronous service. The service events 710 displayed via the service provider interface 114 may be listed in a particular section based on whether the servicing user is in progress with working on the service event 710. For example, the service events 710 that the servicing user is not currently working on may be listed under the section 740 labeled as "Up Next."

Figure 8:
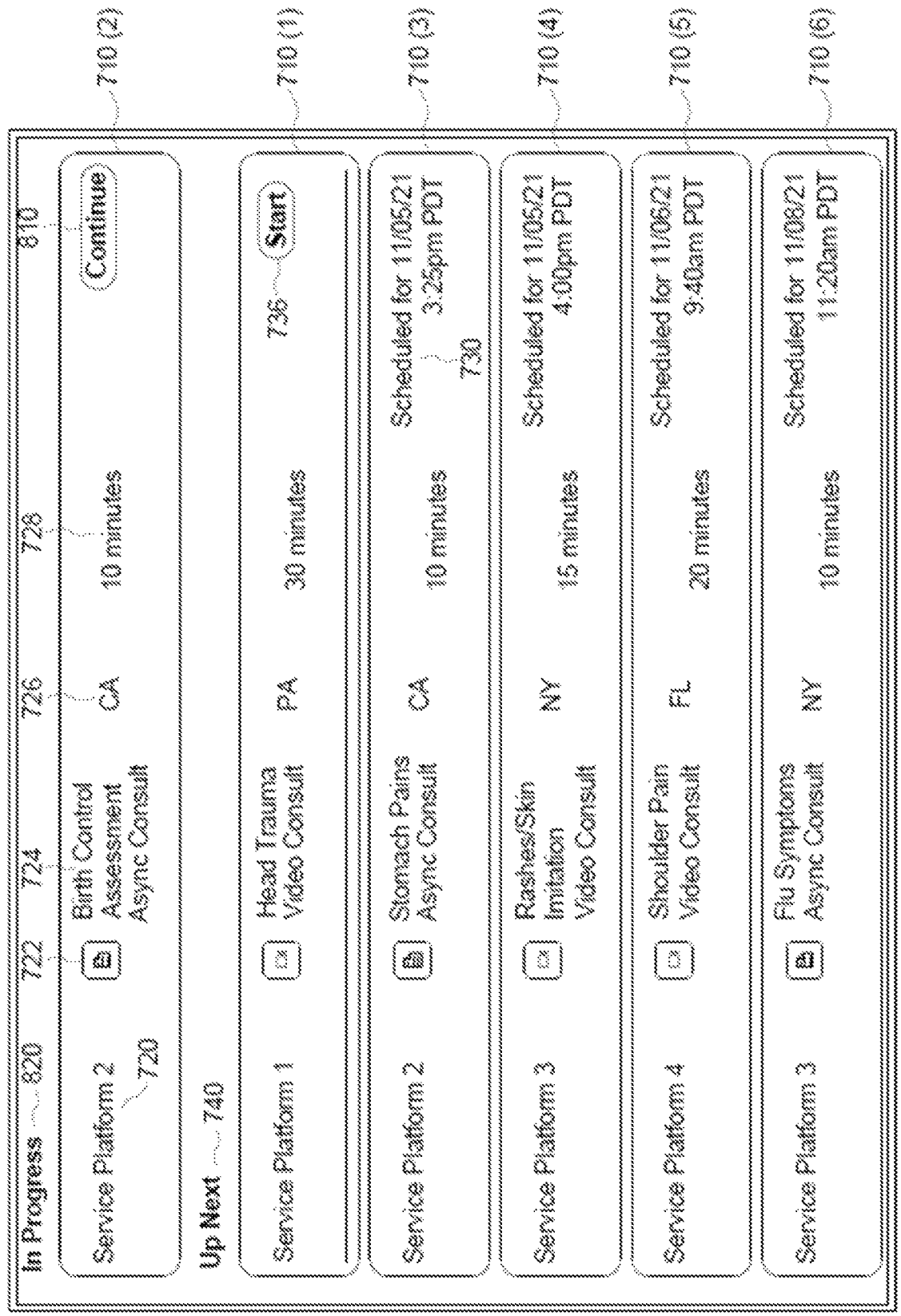
FIG. 8 illustrates an example graphical user interface displaying service events corresponding to assigned service requests according to some embodiments.

FIG. 8 illustrates another example graphical user interface displaying service events corresponding to assigned service requests according to some embodiments. The graphical user interface in FIG. 8 may be implemented and displayed via the service provider interface 114. In some embodiments, a servicing user may be assigned one or more service requests, with each assigned service request displayed as a service event 710. The particular servicing user may accept an assigned asynchronous service request, for example, service event 710(2). After the assigned asynchronous service request has been accepted, the asynchronous service request, such as service event 710(2), may move to a section 820 labeled as "In Progress." The "In Progress" section 820 may include a list of service events 710 that are currently being worked on by the particular servicing user. The servicing user may choose to work on a service event 710, such as service event 710(2), that is listed in the "In Progress" section 820. To do so, the servicing user may, for example, click on a "Continue" button 810. The "Continue" button 810 may correspond to a URL of a service platform corresponding to the service request. Each service event 710, whether synchronous or asynchronous, may include information associated with the respective service request, including the type of service 724, the modality of communication 722, the location of the service and/or requesting user 726, the duration of the service 728, the scheduled time of the service 730, the identity of the requesting user, and the service platform identity 720 of the service platform corresponding to the service request.

Figure 9:
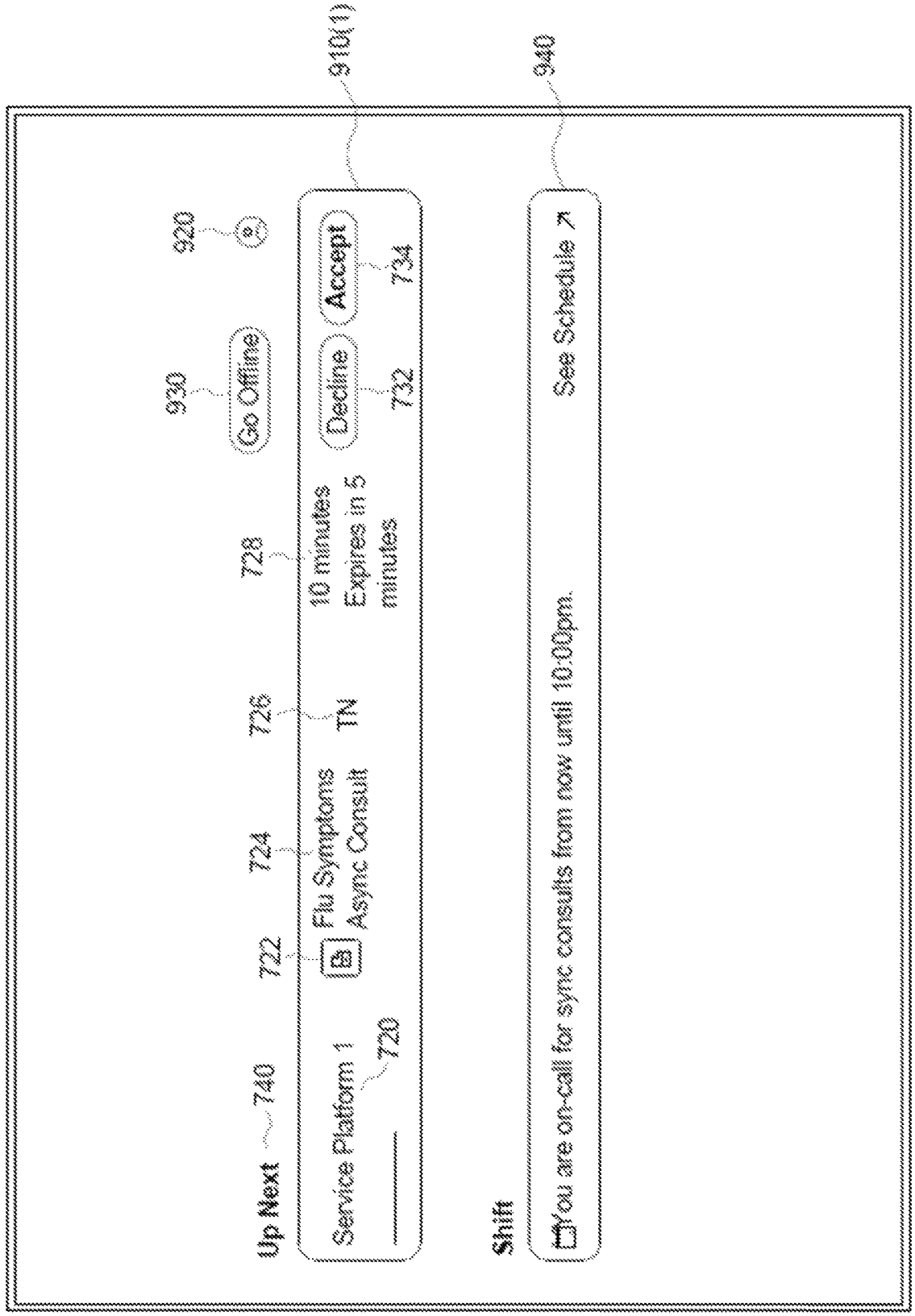
FIG. 9 illustrates an example graphical user interface displaying service events corresponding to assigned service requests according to some embodiments.

FIG. 9 illustrates another example graphical user interface displaying service events corresponding to assigned service requests according to some embodiments. The graphical user interface in FIG. 9 may be implemented and displayed via the service provider interface 114. In some embodiments, a servicing user may see any and all service requests, whether asynchronous or synchronous, that are assigned to the particular servicing user. The servicing user may also see an option to view the schedule of any and all assigned synchronous service requests by interacting with an element of the graphical user interface, for example, a "Shift" option 940. To do so, the servicing user may, for example, choose to click on a "See Schedule" button or link that is displayed in the "Shift" option 940. The service provider interface 114 may also display an account 920 corresponding to information associated with the servicing user using the service provider interface 114. The graphical user interface may also display the status of availability of the particular servicing user. A servicing user may have a status of "Online" when the servicing user is using the service provider interface 114. The status of "Online" may allow the servicing user to work on one or more assigned service requests. The status of a servicing user may be changed by interacting with corresponding elements of the graphical user interface. To do so, the servicing user may, for example, click on a "Go Offline" button 930 to change the status of the servicing user from online to offline. The status of "Offline" may prevent the servicing user from working on any assigned service requests.

Figure 10:
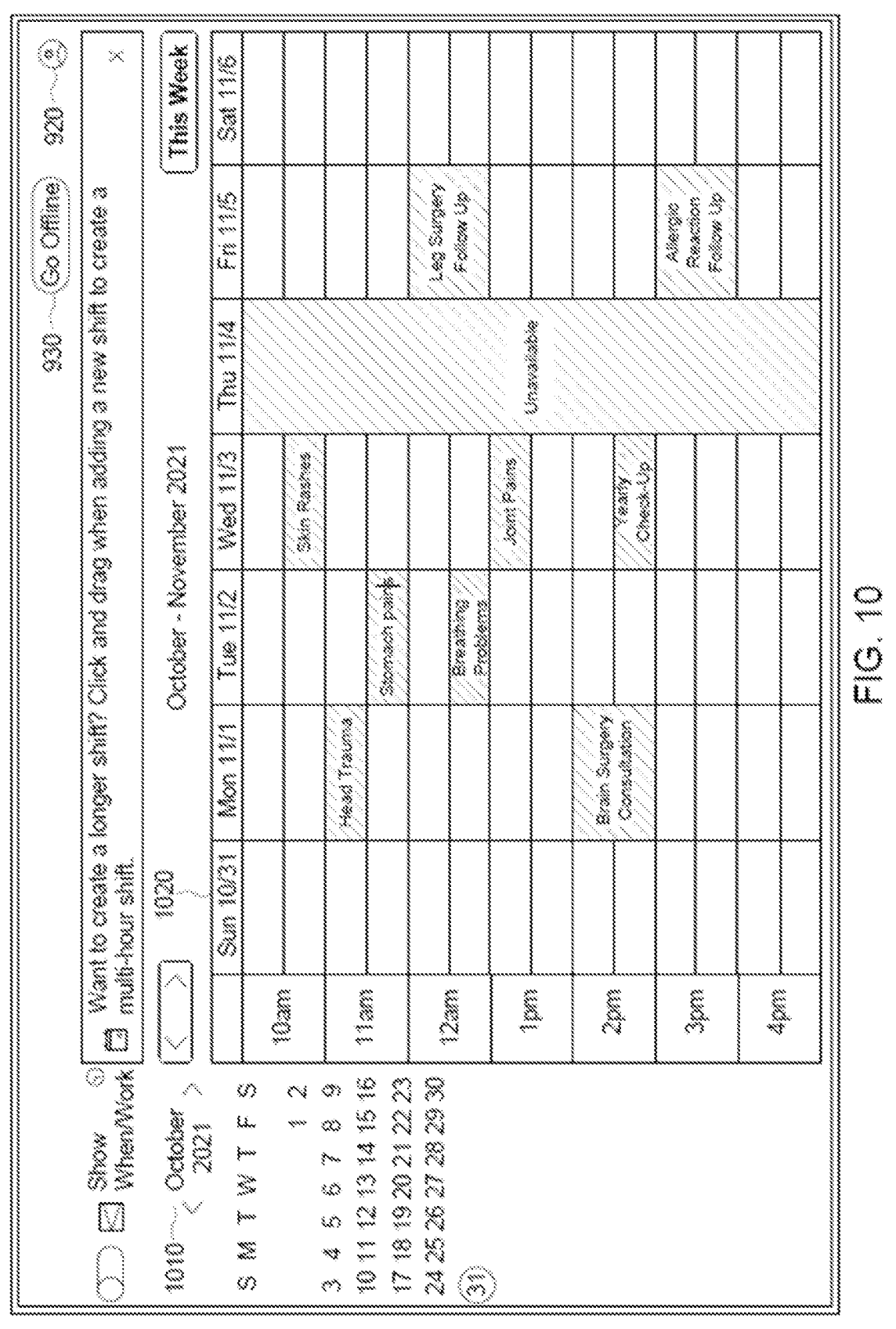

FIG. 10 illustrates an example graphical user interface displaying a servicing user's schedule of service events corresponding to assigned service requests according to some embodiments. In some embodiments, the service manager 104 may display a calendar 1010 showing a schedule 1020 of any and all of the service events. The assigned service requests in the schedule 1020 of the particular servicing user may include synchronous service requests and asynchronous service requests. The schedule 1020 may display any and all of the assigned service requests that a servicing user has set for a particular time period. The schedule 1020 may also display when the days and times of each assigned service request. The schedule 1020 may also display when the servicing user is available and unavailable to be assigned service requests for a particular week.

Figure 11:
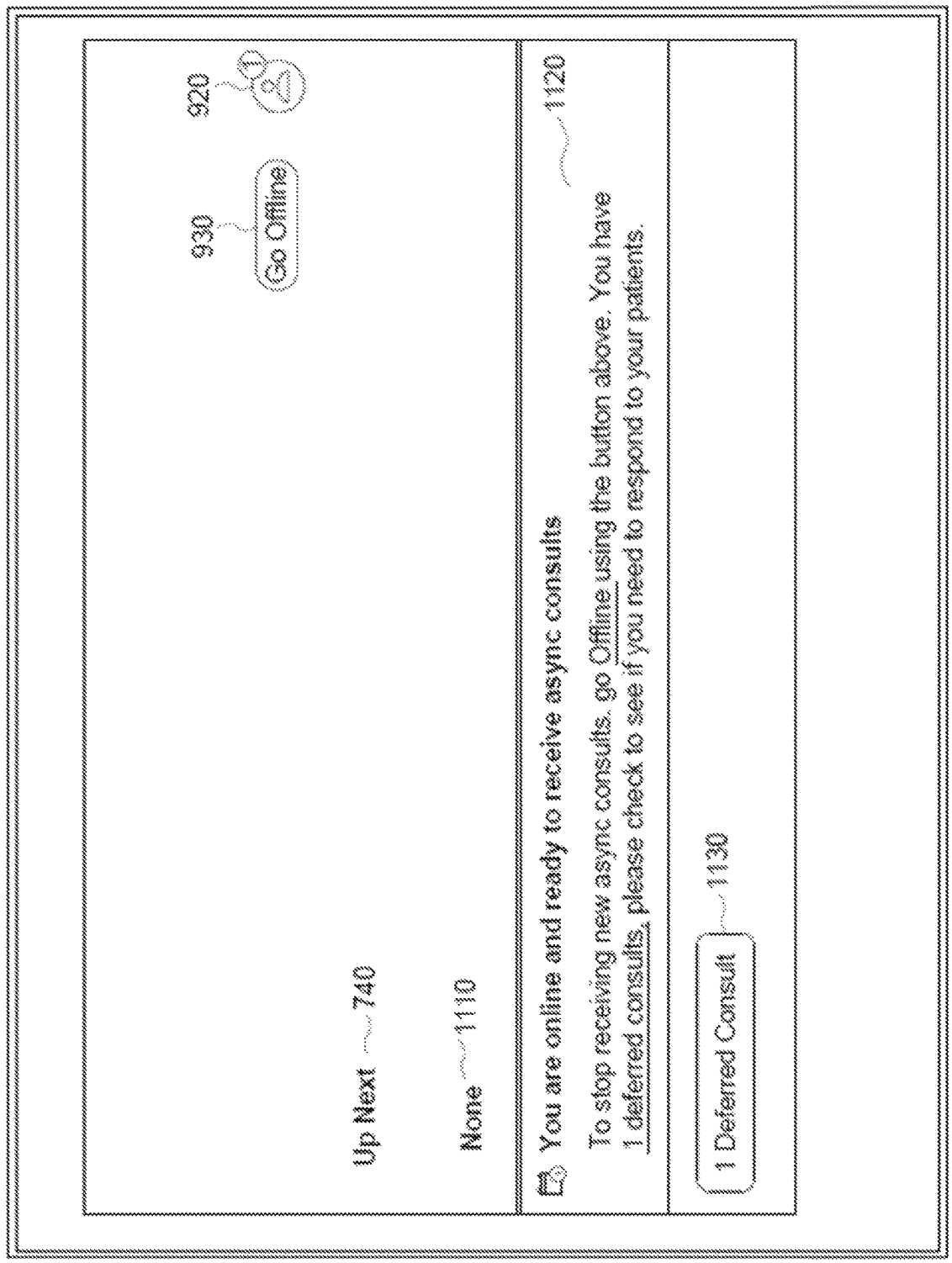
FIG. 11 illustrates an example graphical user interface displaying a status of a servicing user according to some embodiments.

FIG. 11 illustrates an example graphical user interface displaying a status of a servicing user according to some embodiments. In some embodiments, after a servicing user has completed all assigned service events, the section 740 labeled as "Up Next" may display an indicator 1110 labeled as "None." In some embodiments, after a servicing user has fulfilled a service request, the servicing user may be notified that they are able to receive and/or be assigned a new asynchronous service request or consult. For example, the graphical user interface may display notification 1120 stating "You are online and ready to receive async consults." The graphical user interface may also display the status of availability of the particular servicing user. The graphical user interface may also display any and all servicing requests that have yet to be started, worked on, and/or completed by the particular servicing user, such as deferment notification 1130.

Conditional language used herein, such as, among others, "can," "might," "may," "e.g.," and the like, unless specifically stated otherwise, or otherwise understood within the context as used, is generally intended to convey that some embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

While the above detailed description has shown, described, and pointed out novel features as applied to some embodiments, it will be understood that various omissions, substitutions, and changes in the form and details of the devices or algorithms illustrated can be made without departing from the spirit of the disclosure. As will be recognized, the processes described herein can be embodied within a form that does not provide all of the features and benefits set forth herein, as some features can be used or practiced separately from others. The scope of protection is defined by the appended claims rather than by the foregoing description. All changes which come within the meaning and range of equivalency of the claims are to be embraced within their scope.

The invention claimed is:

1. A method of scheduling user-to-user service between users of different computing systems, comprising, by a middleware computing platform:
   maintaining an active user pool comprising a plurality of servicing users;
   exposing a service request interface to a plurality of user-to-user service platforms, wherein the plurality of user-to-user service platforms provide independent computing environments that separately execute user-to-user service workflows for requesting users;
   receiving, via the service request interface, a plurality of service requests each from one of the plurality of user-to-user service platforms;
   automatically assigning one or more of the plurality of service requests to a target servicing user of the plurality of servicing users based at least in part on information associated with the service request and availability of the target servicing user;
   exposing a service provider interface to the target servicing user;
   displaying, on the service provider interface, one or more service events respectively corresponding to the one or more assigned service requests; and
   displaying, on the service provider interface for a service event of the one or more service events, a button corresponding to a uniform resource locator (URL) provided by the service platform from which the assigned service request corresponding to the service event is received, and wherein interaction with the button by the target servicing user hosts a communication session between a requesting user and the target servicing user based on the URL.

2. The method of claim 1, wherein each service event of the one or more service events comprises:
   a uniform resource locator (URL) to the user-to-user service platform from which the service request corresponding to the service event is received.

3. The method of claim 1, wherein automatically assigning the one or more service requests to the target servicing user comprises:
   obtaining a service specification associated with each of the plurality of service requests;
   filtering the active user pool to identify a subset of servicing users based on the service specification and one or more attributes of each of the plurality of servicing users;
   ranking the subset of servicing users; and
   selecting the target servicing user from the subset of servicing users based on the ranking.

4. The method of claim 1, wherein automatically assigning the one or more service requests to the target servicing user comprises:
   obtaining a service specification associated with each of the plurality of service requests;
   filtering the plurality of service requests to identify a subset of servicing requests based on one or more attributes of the target servicing user and the service specification associated with each of the plurality of service requests;
   ranking the subset of service requests; and
   selecting at least one service request from the subset of service requests based on the ranking to assign to the target servicing user.

5. The method of claim 1, wherein automatically assigning the one or more service requests to the target servicing user comprises:
   obtaining a service specification associated with each of the plurality of service requests;
   determining, based on the service specification associated with each service request, whether the service request corresponds to a synchronous communication session or an asynchronous communication session;
   if the service request corresponds to a synchronous communication session, assigning the service request to the target servicing user by assigning a time period of the target servicing user's schedule to the service request; and
   if the service request corresponds to an asynchronous communication session, assigning the service request to the target servicing user by adding the service request to a pipeline of service requests associated with the target servicing user.

6. The method of claim 1, wherein displaying, on the service provider interface, one or more service events respectively corresponding to the one or more assigned service requests comprises:
   sorting the one or more service events in the service provider interface; and
   displaying a status indicator for each of the one or more service events.

7. The method of claim 1, further comprising:
   determining a completion event for at least one of the one or more service events;
   removing the at least one service event from the service provider interface.

8. A system for scheduling user-to-user service between users of different computing systems, comprising a processor and memory storing instructions executable by the processor to cause the system to perform operations comprising:

maintaining an active user pool comprising a plurality of servicing users;

exposing a service request interface to a plurality of user-to-user service platforms, wherein the plurality of user-to-user service platforms provide independent computing environments that separately execute user-to-user service workflows for requesting users;

receiving, via the service request interface, a plurality of service requests each from one of the plurality of user-to-user service platforms;

automatically assigning one or more of the plurality of service requests to a target servicing user of the plurality of servicing users based at least in part on information associated with the service request and availability of the target servicing user;

exposing a service provider interface to the target servicing user;

displaying, on the service provider interface, one or more service events respectively corresponding to the one or more assigned service requests; and displaying, on the service provider interface for a service event of the one or more service events, a button corresponding to a uniform resource locator (URL) provided by the service platform from which the assigned service request corresponding to the service event is received, and wherein interaction with the button by the target servicing user hosts a communication session between a requesting user and the target servicing user based on the URL.

9. The system of claim 8, wherein each service event of the one or more service events comprises:

a uniform resource locator (URL) to the user-to-user service platform from which the service request corresponding to the service event is received.

10. The system of claim 8, wherein automatically assigning the one or more service requests to the target servicing user comprises:

obtaining a service specification associated with each of the plurality of service requests;

filtering the active user pool to identify a subset of servicing users based on the service specification and one or more attributes of each of the plurality of servicing users;

ranking the subset of servicing users; and selecting the target servicing user from the subset of servicing users based on the ranking.

11. The system of claim 8, wherein automatically assigning the one or more service requests to the target servicing user comprises:

obtaining a service specification associated with each of the plurality of service requests;

filtering the plurality of service requests to identify a subset of servicing requests based on one or more attributes of the target servicing user and the service specification associated with each of the plurality of service requests;

ranking the subset of servicing requests; and selecting at least one service request from the subset of service requests based on the ranking to assign to the target servicing user.

12. The system of claim 8, wherein automatically assigning the one or more service requests to the target servicing user comprises:

obtaining a service specification associated with each of the plurality of service requests;

determining, based on the service specification associated with each service request, whether the service request corresponds to a synchronous communication session or an asynchronous communication session;

if the service request corresponds to a synchronous communication session, assigning the service request to the target servicing user by assigning a time period of the target servicing user's schedule to the service request; and if the service request corresponds to an asynchronous communication session, assigning the service request to the target servicing user by adding the service request to a pipeline of service requests associated with the target servicing user.

13. The system of claim 8, wherein displaying, on the service provider interface, one or more service events respectively corresponding to the one or more assigned service requests comprises:

sorting the one or more service events in the service provider interface; and displaying a status indicator for each of the one or more service events.

14. The system of claim 8, further comprising:

determining a completion event for at least one of the one or more service events; removing the at least one service event from the service provider interface.

15. A non-transitory computer-readable storage medium for scheduling user-to-user service between users of different computing systems, configured with instructions executable by one or more processors to cause the one or more processors to perform operations comprising, by a middleware computing platform:

maintaining an active user pool comprising a plurality of servicing users;

exposing a service request interface to a plurality of user-to-user service platforms, wherein the plurality of user-to-user service platforms provide independent computing environments that separately execute user-to-user service workflows for requesting users;

receiving, via the service request interface, a plurality of service requests each from one of the plurality of user-to-user service platforms;

automatically assigning one or more of the plurality of service requests to a target servicing user of the plurality of servicing users based at least in part on information associated with the service request and availability of the target servicing user;

exposing a service provider interface to the target servicing user;

displaying, on the service provider interface, one or more service events respectively corresponding to the one or more assigned service requests; and displaying, on the service provider interface for a service event of the one or more service events, a button corresponding to a uniform resource locator (URL) provided by the service platform from which the assigned service request corresponding to the service event is received, and wherein interaction with the button by the target servicing user hosts a communication session between a requesting user and the target servicing user based on the URL.

16. The medium of claim 15, wherein automatically assigning the one or more service requests to the target servicing user comprises:

obtaining a service specification associated with each of the plurality of service requests;

filtering the active user pool to identify a subset of servicing users based on the service specification and one or more attributes of each of the plurality of servicing users;
ranking the subset of servicing users; and
selecting the target servicing user from the subset of servicing users based on the ranking.

17. The medium of claim 15, wherein automatically assigning the one or more service requests to the target servicing user comprises:
obtaining a service specification associated with each of the plurality of service requests;
filtering the plurality of service requests to identify a subset of servicing requests based on one or more attributes of the target servicing user and the service specification associated with each of the plurality of service requests;
ranking the subset of service requests; and
selecting at least one service request from the subset of service requests based on the ranking to assign to the target servicing user.

18. The medium of claim 15, wherein automatically assigning the one or more service requests to the target servicing user comprises:
obtaining a service specification associated with each of the plurality of service requests;
determining, based on the service specification associated with each service request, whether the service request corresponds to a synchronous communication session or an asynchronous communication session;
if the service request corresponds to a synchronous communication session, assigning the service request to the target servicing user by assigning a time period of the target servicing user's schedule to the service request; and
if the service request corresponds to an asynchronous communication session, assigning the service request to the target servicing user by adding the service request to a pipeline of service requests associated with the target servicing user.

19. The medium of claim 15, wherein displaying, on the service provider interface, one or more service events respectively corresponding to the one or more assigned service requests comprises:
sorting the one or more service events in the service provider interface; and
displaying a status indicator for each of the one or more service events.

20. The medium of claim 15, wherein the operations further comprise:
determining a completion event for at least one of the one or more service events; removing the at least one service event from the service provider interface.

* * * * *